United States Patent
Zhou

(10) Patent No.: US 9,954,989 B2
(45) Date of Patent: Apr. 24, 2018

(54) LOCK SCREEN GRAPHICAL USER INTERFACE

(71) Applicant: Eyespage Inc., Dublin, CA (US)

(72) Inventor: Jing Zhou, Beijing (CN)

(73) Assignee: Eyespage Inc., Dublin, CA (US)

( * ) Notice: Subject to any disclaimer, the term of this patent is extended or adjusted under 35 U.S.C. 154(b) by 0 days.

(21) Appl. No.: 14/653,359

(22) PCT Filed: May 6, 2015

(86) PCT No.: PCT/CN2015/078363
§ 371 (c)(1),
(2) Date: Jun. 18, 2015

(87) PCT Pub. No.: WO2016/176834
PCT Pub. Date: Nov. 10, 2016

(65) Prior Publication Data
US 2018/0048752 A1   Feb. 15, 2018

(51) Int. Cl.
| | |
|---|---|
| H04M 1/67 | (2006.01) |
| H04M 1/725 | (2006.01) |
| G06F 3/16 | (2006.01) |
| G06F 3/0486 | (2013.01) |
| G06F 3/0481 | (2013.01) |

(52) U.S. Cl.
CPC ............ *H04M 1/67* (2013.01); *G06F 3/0486* (2013.01); *G06F 3/04817* (2013.01); *G06F 3/167* (2013.01); *H04M 1/72583* (2013.01)

(58) Field of Classification Search
None
See application file for complete search history.

(56) References Cited

U.S. PATENT DOCUMENTS

2009/0265666 A1   10/2009   Hsieh et al.
2014/0047020 A1   2/2014   Matus et al.

FOREIGN PATENT DOCUMENTS

| CN | 103543926 A | 1/2014 |
|---|---|---|
| CN | 103986832 A | 8/2014 |
| WO | 2016176834 | 11/2016 |

OTHER PUBLICATIONS

"International Application Serial No. PCT/CN2015/078363, International Search Report dated Feb. 1, 2016", 4 pgs.
"International Application Serial No. PCT/CN2015/078363, Written Opinion dated Feb. 1, 2016", 4 pgs.

*Primary Examiner* — Nathan Mitchell
*Assistant Examiner* — Ernest Tacsik
(74) *Attorney, Agent, or Firm* — Schwegman Lundberg & Woessner, P.A.

(57) ABSTRACT

A device is configured to generate and present a lock screen graphical user interface while the device is in a locked state in which, for example, the device displays a lock screen to a user of the device. The device is further configured to detect a current activity of the user while the device is in its locked state. This detection may be based on context data generated by a sensor within the device. The device is further configured to select an activity icon from a set of activity icons based on the detected current activity of the user. The device then causes the selected activity icon to be displayed while the device is in its locked state. The selected and displayed activity icon is operable to cause display of a pop-up window that corresponds to the selected activity icon while the device is still in its locked state.

21 Claims, 18 Drawing Sheets

LOCK SCREEN GRAPHICAL USER INTERFACE

RELATED APPLICATIONS

This application is a U.S. National Stage Application under 35 U.S.C. § 371 of International Application No. PCT/CN2015/078363, filed May 6, 2015, which application is hereby incorporated by reference in its entirety.

TECHNICAL FIELD

The subject matter disclosed herein generally relates to machines that are configured to process data. Specifically, the present disclosure addresses systems and methods to facilitate a lock screen graphical user interface (GUI).

BACKGROUND

Many machines (e.g., devices) communicate visual information to their users via screens (e.g., light emitting display screens, projector screens, or heads-up displays). As an example of such a machine, a device (e.g., a portable hand-held device) may include a touch-sensitive screen (e.g., a touchscreen) that is configured to both display visual information and detect user input in the form of various touches (e.g., taps, double taps, drags, pinches, and reverse pinches).

In some implementations, a device with a touch-sensitive screen is configured (e.g., programmed) to operate in a locked state or an unlocked state. In the locked state, the device may exclusively display on its screen a "lock screen" that indicates the device is in the locked state and prevents access to any other GUI on the device. Furthermore, the device in the locked state may ignore all user inputs (e.g., touches on the touch-sensitive screen) except a user input that represents a command to exit the locked state and enter the unlocked state of the device (e.g., a tap or drag in a particular portion of the touch-sensitive screen). In entering the unlocked state, the device ceases displaying the lock screen and provides access to (e.g., displays) one or more GUIs available on the device (e.g., for normal operation of the device).

BRIEF DESCRIPTION OF THE DRAWINGS

Some embodiments are illustrated by way of example and not limitation in the figures of the accompanying drawings.

DETAILED DESCRIPTION

Figure 1:
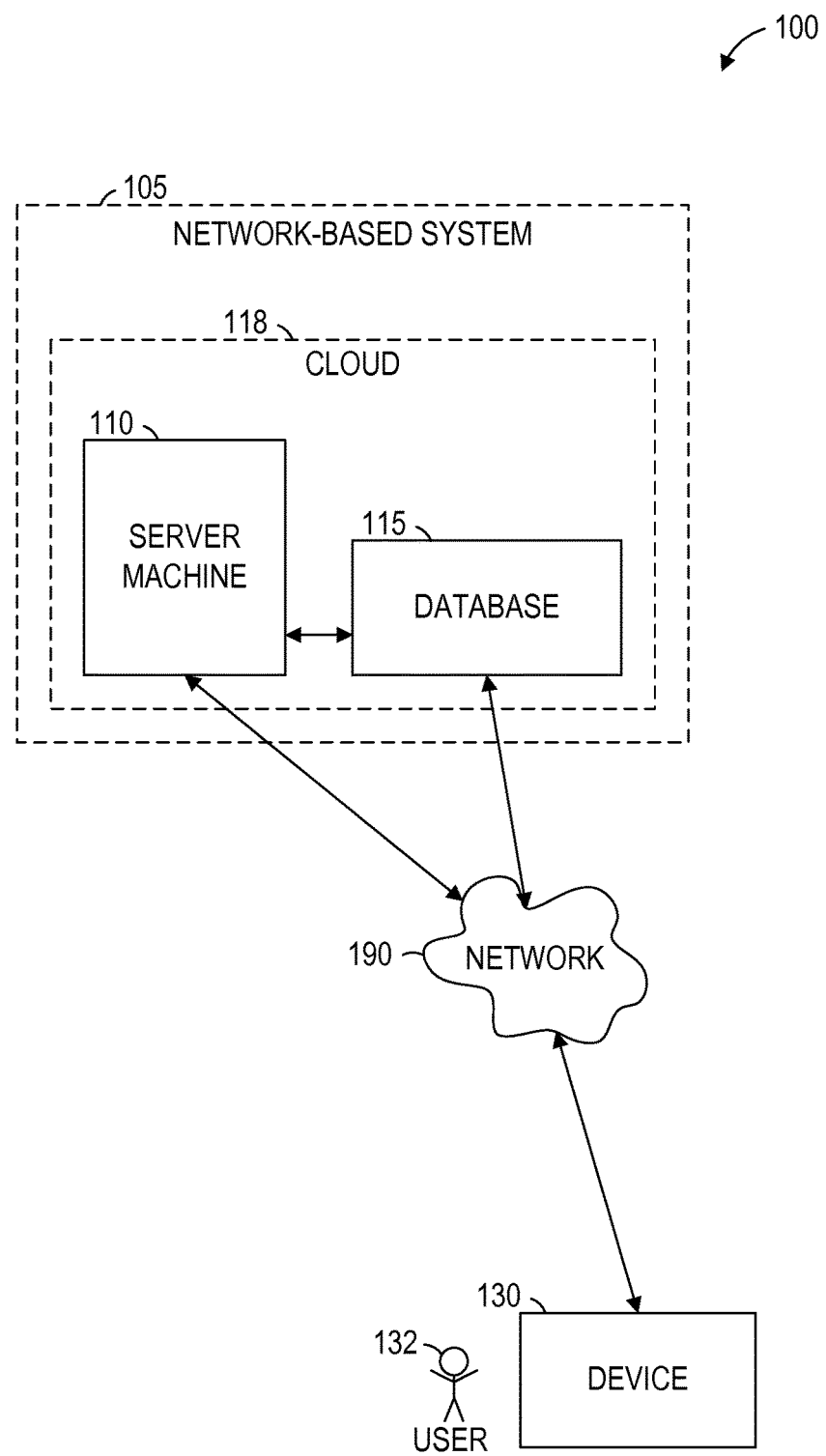
FIG. 1 is a network diagram illustrating a network environment suitable for a device with a lock screen GUI, according to some example embodiments.

Example methods and systems are directed to a lock screen GUI for a device or other machine. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A device may be configured (e.g., by software that is stored by the device and executable by one or more processors of the device) to generate (e.g., create) a lock screen GUI and present (e.g., display) the lock screen GUI to a user of the device. The lock screen GUI may be generated, presented, or both, while the device is in a locked state in which, for example, the screen of the device displays a lock screen that prevents the user from accessing a set of one or more home screens. Each of such home screens may include and display one or more application icons that are operable by the user (e.g., by a touch input, such as, tapping) to initiate executions of applications by the device.

In accordance with the example methods and systems described herein, the device is configured (e.g., programmed) by at least a detection module, an icon module, and an interaction module, each of which may include and configure one or more processors (e.g., computer processors or other machine processors) to perform operations described herein for that module. The detection module is configured to detect a current activity of the user (e.g., an expected, predicted, inferred, or most likely activity in which the user is presently engaged), while the device is in its locked state. This detection of the current activity of the user may be based on context data generated by a set of one or more sensors within the device. By virtue of the detection module, the device is thus configured to detect the user's current activity.

The icon module is configured to select an activity icon from a set of activity icons available (e.g., stored) on the device. This selection is based on the current activity of the user. The icon module is also configured to cause the selected activity icon to be displayed on the screen of the device while the device is in the locked state. The activity icon is operable by the user to cause display of a pop-up window that corresponds to the selected activity icon (e.g., a pop up window for that activity icon), while the device is in the locked state. By virtue of the icon module, the device is thus configured to select and display one or more of such activity icons based on the user's current activity, which may have the effect of prompting the user to confirm that the user is indeed engaging in that current activity. In some example embodiments, there is no overlap between the activity icons available for use in the lock screen GUI and the application icons included in the one or more home screens of the device The interaction module is configured to detect that the displayed activity icon is operated (e.g., tapped) by the user, select a subset of application icons from the home screens based on the operated activity icon, and generate and display the pop-up window that corresponds to the operated activity icon, while the device is still in its locked state. The generated and displayed pop-up window displays the selected subset of the application icons and enables operation of the subset of application icons while the device is still in the locked state (e.g., still displaying at least a portion of the lock screen that otherwise would prevent the user from accessing any application icons included in the set of home screens). By virtue of the interaction module, the device is thus configured to generate and display a user-operable subset of application icons that have been selected based on the current activity of the user (e.g., as confirmed by the user). This enables the user to access application icons that are relevant to the user's current activity, while the device is in the locked state and without navigating through the set of home screens to locate these relevant application icons.

Accordingly, the lock screen GUI generated and displayed by the device may enable the user to quickly find and execute one or more of the applications that correspond to the subset of application icons displayed in the pop-up window, while the device is in the locked state. Hence, a device configured to generate and display this lock screen GUI is improved compared to similar devices that lack this lock screen GUI, for at least the reason that the lock screen GUI enables quick and convenient access to applications relevant to the user's current activity, without troubling the user to unlock the device and access these applications via any home screens. Further details are described below.

FIG. 1 is a network diagram illustrating a network environment suitable for a device with a lock screen GUI, according to some example embodiments. The network environment 100 includes a server machine 110, a database 115, and a device 130, all communicatively coupled to each other via a network 190. The server machine 110 may form all or part of a cloud 118 (e.g., a geographically distributed set of multiple machines configured to function as a single server), which may form all or part of a network-based system 105 (e.g., a cloud-based server system configured to provide one or more services to the device 130). The server machine 110 and the device 130 may each be implemented in a computer system, in whole or in part, as described below with respect to FIG. 18.

Also shown in FIG. 1 is a user 132 of the device 130. The user 132 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a temporary or permanent operator of the device 130. For example, the device 130 may be a desktop computer, a vehicle computer, a tablet computer, a navigational device, a portable media device, a smartphone, or a wearable device (e.g., a smart watch or smart glasses) belonging to the user 132.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 18. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
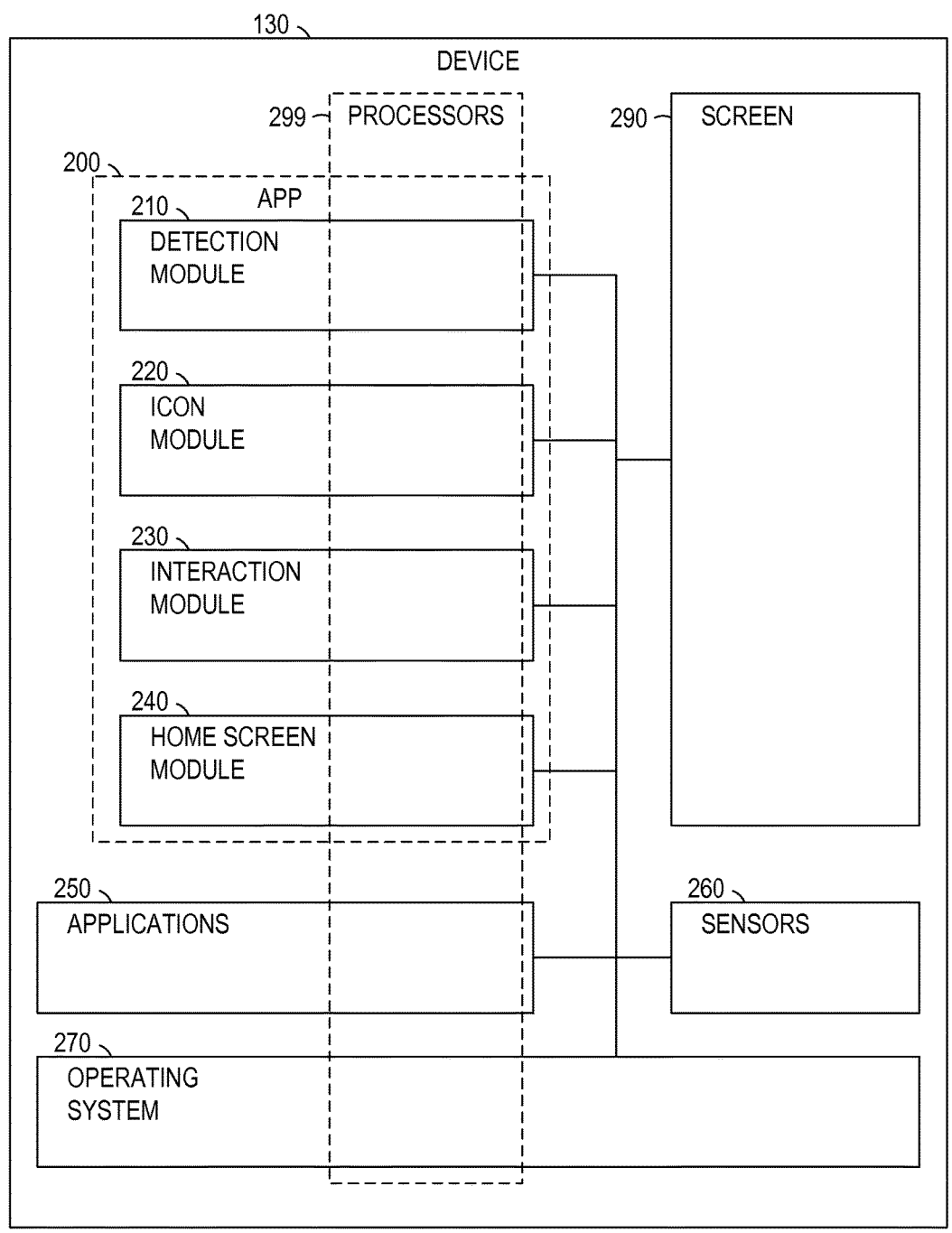
FIG. 2 is a block diagram illustrating components of the device with the lock screen GUI, according to some example embodiments.

FIG. 2 is a block diagram illustrating components of the device 130, according to some example embodiments. The device 130 is shown as including a detection module 210, an icon module 220, an interaction module 230, a home screen module 240, one or more applications 250 (e.g., software programs, mobile apps, or other executable applications), one or more sensors 260, an operating system 270, and a screen 290 (e.g., a touch-sensitive screen), all configured to communicate with each other (e.g., via a bus, shared memory, or a switch).

As shown in FIG. 2, the detection module 210, the icon module 220, the interaction module 230, and the home screen module 240 may form all or part of an app 200 (e.g., a mobile app) that is stored (e.g., installed) on the device 130. Furthermore, one or more processors 299 (e.g., digital processors) may be included (e.g., temporarily or permanently) in the app 200, the detection module 210, the icon module 220, the interaction module 230, the home screen module 240, the applications 250, the operating system 270, or any suitable combination thereof.

The screen 290 may be or include a touch-sensitive screen (e.g., a touchscreen or other touch-detecting display component). The sensors 260 may be or include any type of data generating input component configured to detect information about the device 130 and its surrounding environment. Examples of such input components are discussed below with respect to FIG. 18.

Any one or more of the modules described herein may be implemented using hardware alone (e.g., one or more processors 299) or a combination of hardware and software. For example, any module described herein may physically include an arrangement of one or more processors 299 (e.g., a subset of or among the one or more processors of the machine) configured to perform the operations described herein for that module. As another example, any module described herein may include software, hardware, or both, that configure an arrangement of one or more processors 299 (e.g., among the one or more processors of the machine) to perform the operations described herein for that module. Accordingly, different modules described herein may include and configure different arrangements of such processors 299 or a single arrangement of such processors 299 at different points in time. Moreover, any two or more modules described herein may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
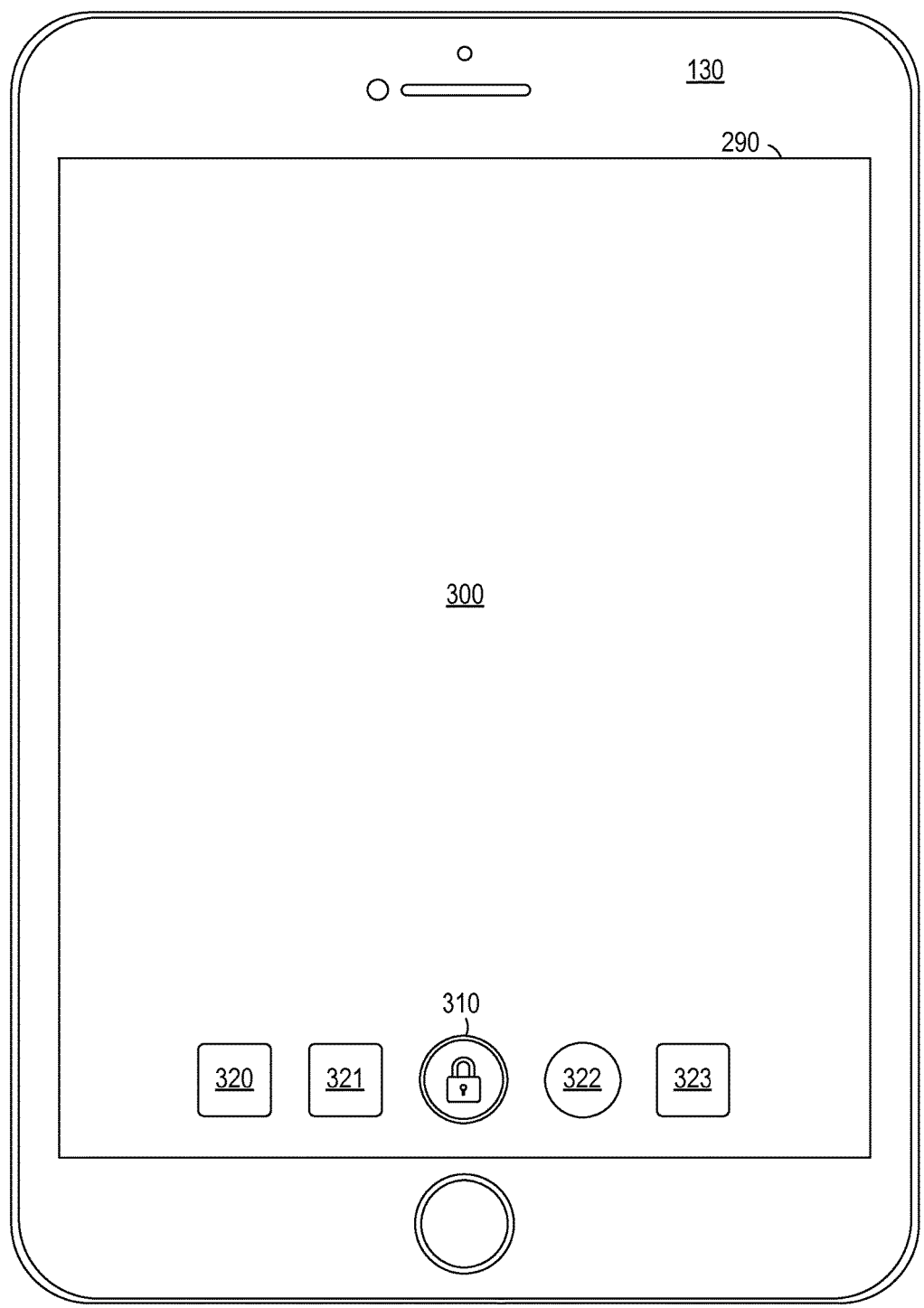
FIGS. 3-8 are device diagrams illustrating a screen of the device and illustrating the lock screen GUI, according to some example embodiments.

FIGS. 3-8 are device diagrams illustrating a screen of the device 130 and illustrating the appearance and usage of the lock screen GUI, according to some example embodiments. In FIG. 3, the device 130 is depicted in the example form of a smart phone or tablet computer showing contents of the screen 290. As shown in FIG. 3, the device 130 is in its locked state, and consequently the screen 290 displays a lock screen 300. As noted above, display of the lock screen 300 prevents the user 132 from accessing a set of one or more home screens in which application icons are displayed and operable to initiate executions of corresponding applications by the device 130. In the example illustrated in FIG. 3, the lock screen 300 includes an unlock icon 310, which may be operable (e.g., by tapping) to unlock the device 130 (e.g., cause the device 130 to exit its locked state and enter its unlocked state). The lock screen 300 may be stored by the device 130 and presented by the device 130 (e.g., according to the operating system 270), whenever the device 130 is in its locked state.

In some example embodiments, the lock screen 300 further includes one or more special access icons 320, 321, 322, and 323. Each of these special access icons 320-323 may respectively provide access (e.g., despite the lock screen 300 preventing access to the home screens) to a function of the device 130, including an application executable by the device 130. For example, the special access icon 320 may be operable to unlock the device 130 and execute an application that corresponds to the special access icon 320. As another example, the special access icon 321 may be operable to unlock the device 130 and invoke a feature of the operating system 270 (e.g., set local time, connect to the network 190, or turn on a flashlight feature). According to various example embodiments, a special access icon (e.g., special access icon 320 or 321), its corresponding application, or both may be selected (e.g., by the icon module 220 or the operating system 270) based on historical usage data stored by the device 130 (e.g., a log of most frequently launched applications) or may be predetermined (e.g., hardcoded) by the operating system 270.

Figure 4:
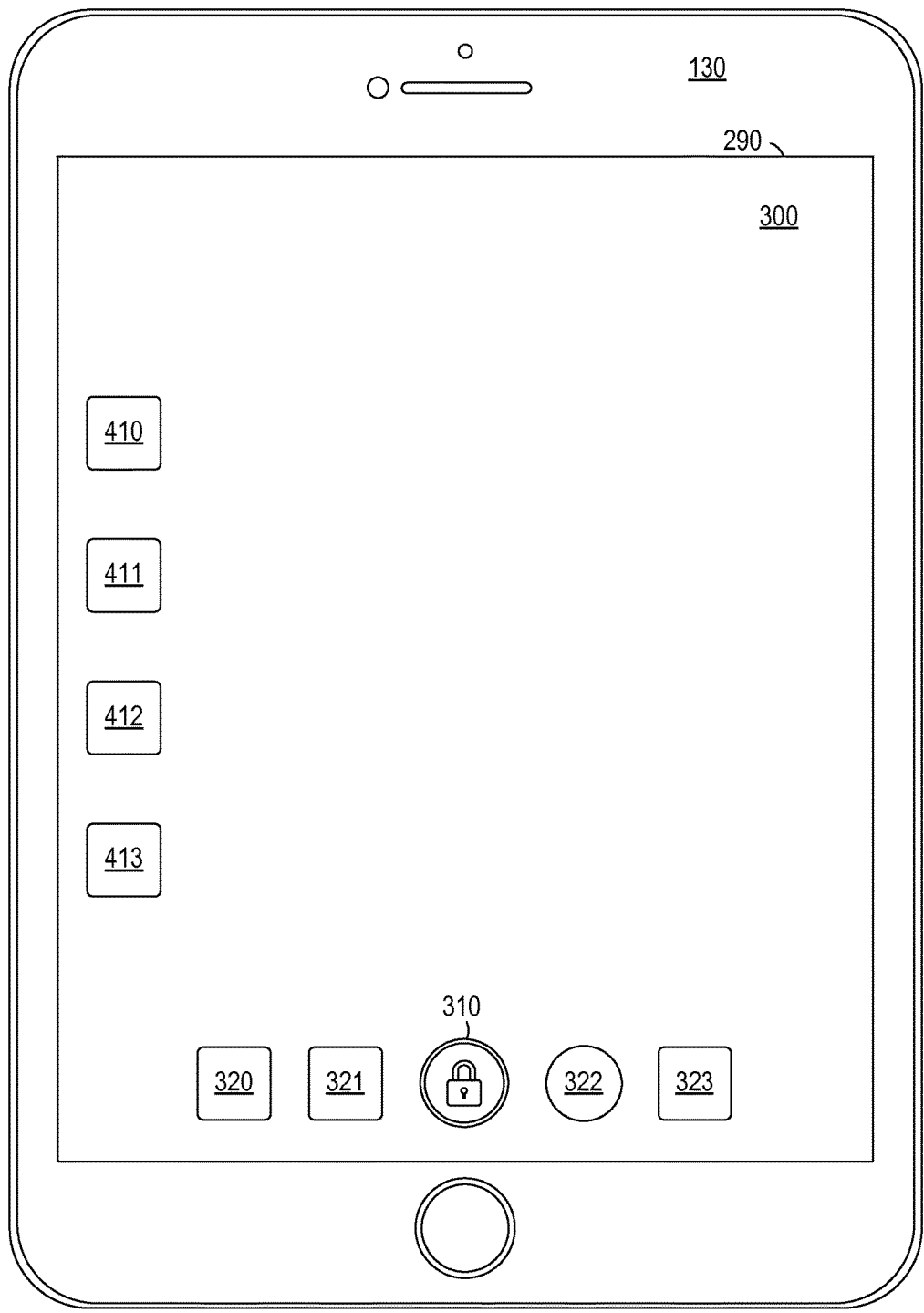

As shown in FIG. 4, the device 130 may additionally display one or more activity icons 410, 411, 412, and 413 on the lock screen 300, while the device 130 is still in its locked state. The activity icons 410-413 may be displayed in response to detection of the current activity (e.g., driving to work) of the user 132 by the detection module 210. Each of the displayed activity icons 410-413 may visually indicate and correspond to a different activity (e.g., activities frequently performed by the user 132). For example, the activity icon 410 may visually indicate and correspond to the user 132 driving to work; the activity icon 411 may visually indicate and correspond to the user 132 attending a meeting; the activity icon 412 may visually indicate and correspond to the user 132 exercising at a gym; and the activity icon 413 may visually indicate and correspond to the user 132 dining at a restaurant.

The activity icon 410 may be displayed prominently (e.g., topmost among the activity icons 410-413) based on the activity icon 410 corresponding to the detected current activity of the user 132. The other activity icons 411-413 may be included for display along with the activity icon 410, for example, based on historical usage data (e.g., frequency of usage), data gathered by one or more of the sensors 260, or both. In some example embodiments, the detection module 210 detects the current activity of the user 132 by determining a set (e.g., top four or top five) of activities likely to be engaged in by the user 132 and treats the most likely activity as the current activity, such that the activity icon 410 corresponds to the most likely activity and the activity icons 411-413 correspond to other likely activities in which the user 132 could be presently engaged.

In the example illustrated in FIG. 4, the current activity has been detected, and the icon module 220 has selected the activity icons 410-413 from a larger set of activity icons available (e.g., stored) on the device 130 (e.g., within icon module 220 or another portion of the app 200). In addition, the icon module 220 has caused the selected activity icons 410-413 to be displayed on the screen 290 while the device 130 is in the locked state and displaying at least part of the lock screen 300.

In the example embodiment depicted in FIG. 4, the activity icons 410-413 are superimposed over the lock screen 300 (e.g., without modifying the lock screen 300). However, in alternative example embodiments, the icon module 220 integrates the activity icons 410-413 into the lock screen 300 (e.g., by modifying the lock screen 300 itself). According to various example embodiments, display of the activity icons 410-413 prompts (e.g., requests, instructs, or suggests) the user 132 to confirm which of the activity icons 410-413 matches or is closest to the actual activity in which the user 132 is presently performing.

Figure 5:
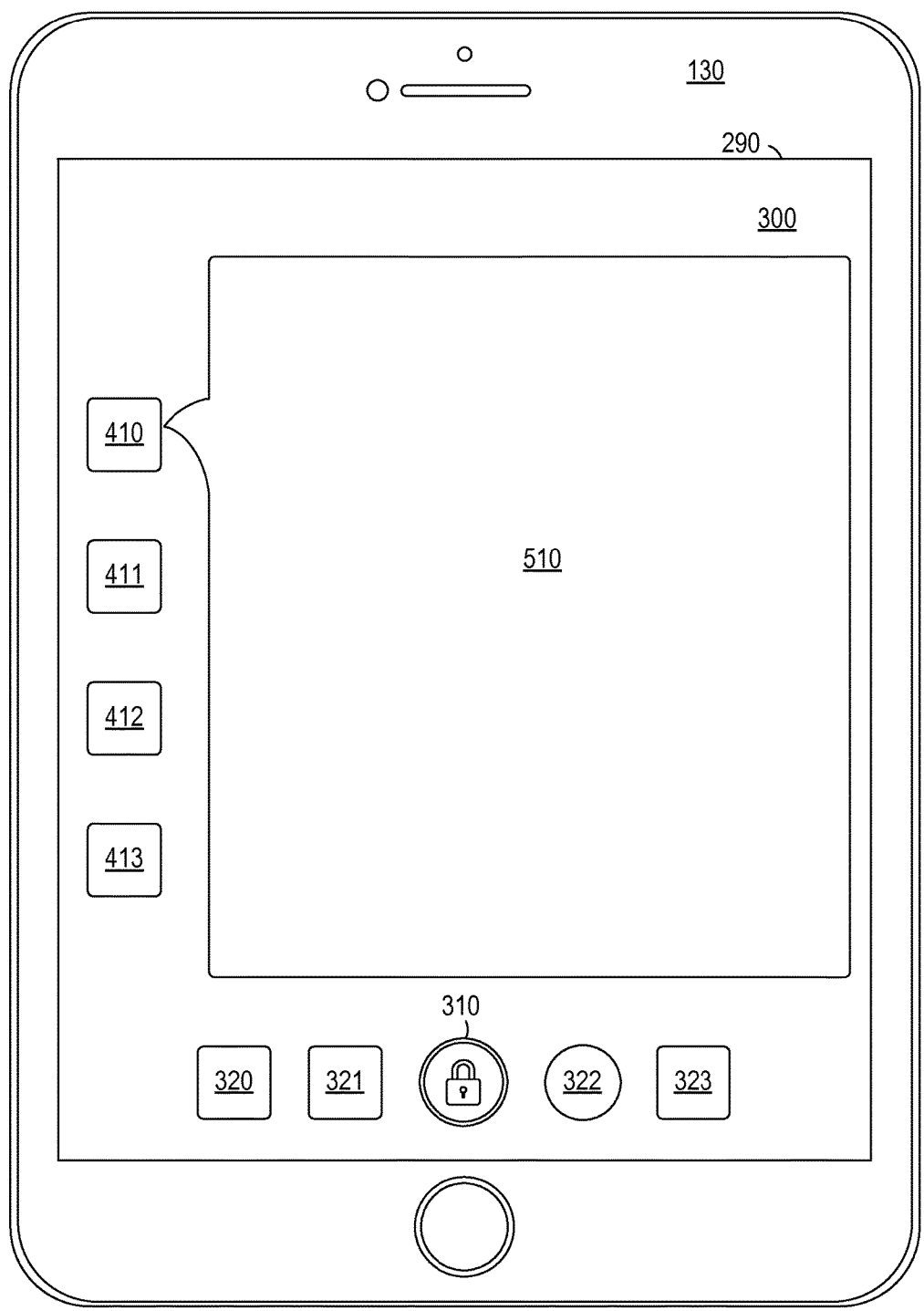

As shown in FIG. 5, the device 130 may additionally display a pop-up window 510 on the lock screen 300 (e.g., contemporaneously with the activity icons 410-413), while the device 130 is still in its locked state. The pop-up window 510 may be displayed in response to operation of one of the displayed activity icons (e.g., activity icon 410). For example, the user 132 may operate activity icon 410 by tapping on the activity icon 410, which may have the effect of confirming that the current activity (e.g., driving to work) visually indicated by the activity icon 410 is indeed the activity in which the user 132 is presently engaged.

The pop-up window 510 may visually indicate which activity icon (e.g., activity icon 410) corresponds to the pop-up window 510. FIG. 5 illustrates this correspondence relationship by depicting the pop-up window 510 as a callout or speech bubble extending from the activity icon 410. As a result, the pop-up window 510 may visually indicate and correspond to the detected current activity of the user 132 (e.g., driving to work, as confirmed by the user 132). Similarly, if the user 132 had operated a different activity icon (e.g., activity icon 411), a different pop-up window would be displayed, and that pop-up window would visually indicate and correspond to a different activity (e.g., attending a meeting, as confirmed by the user 132).

Figure 6:
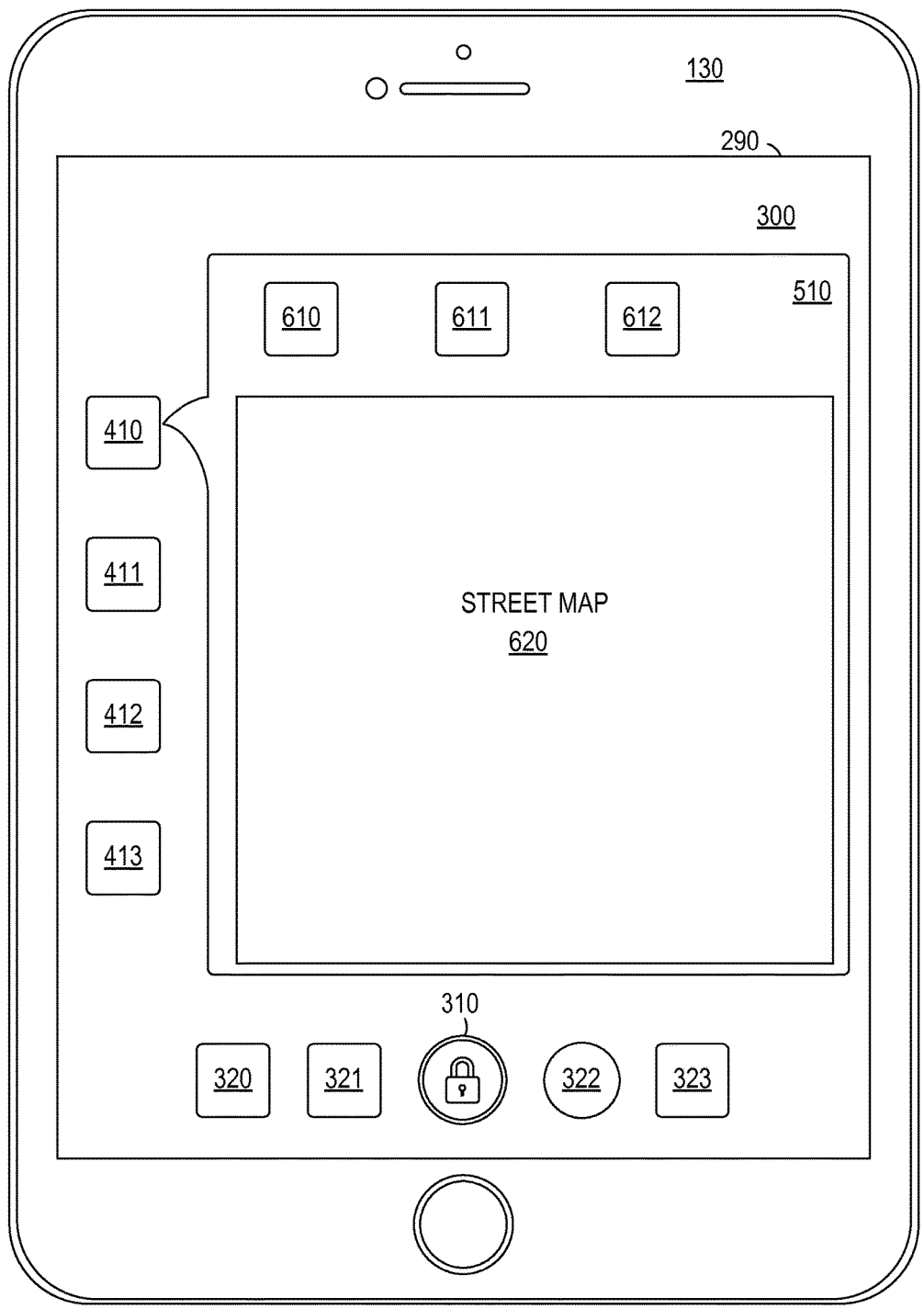
Figure 7:
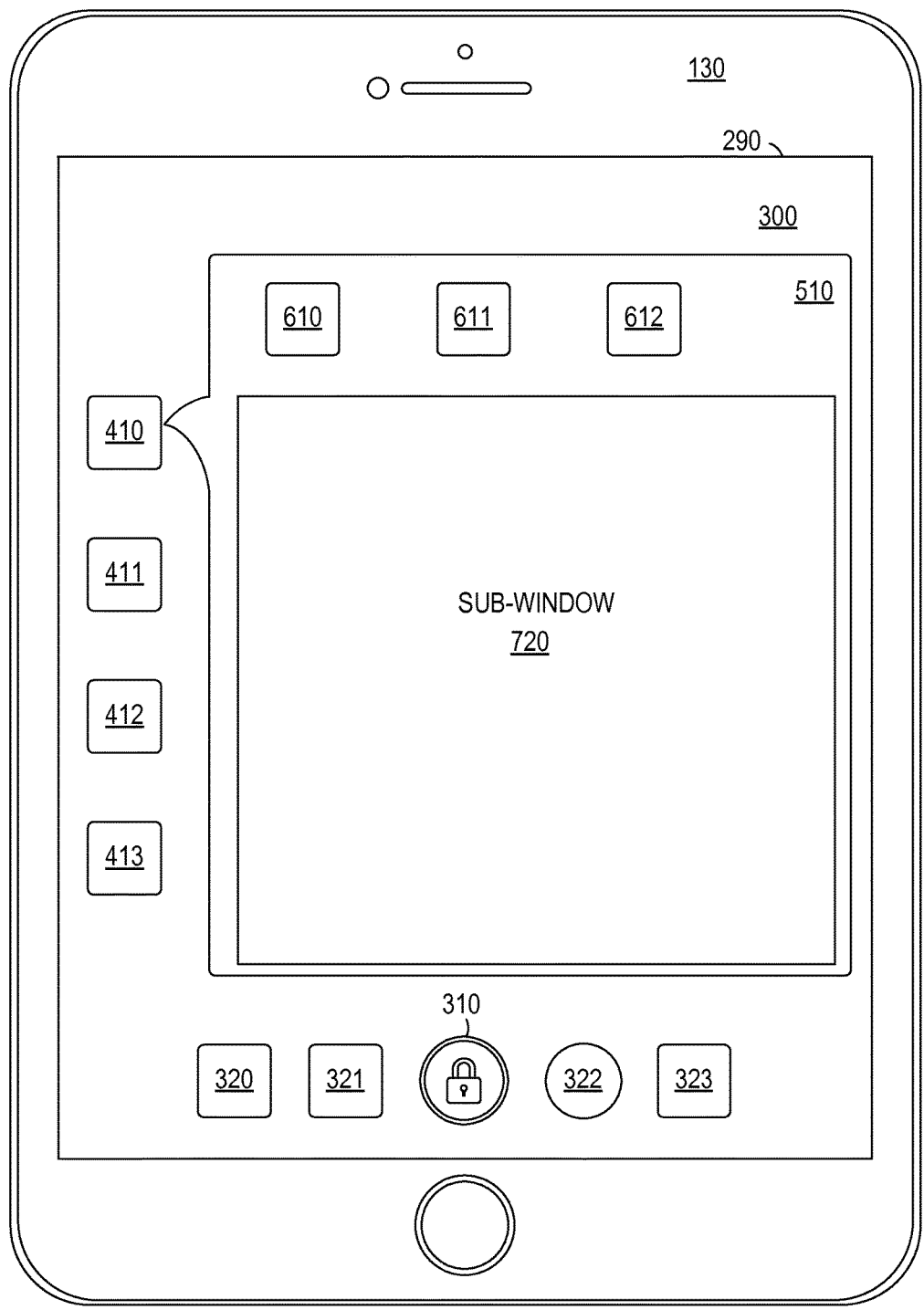
Figure 8:
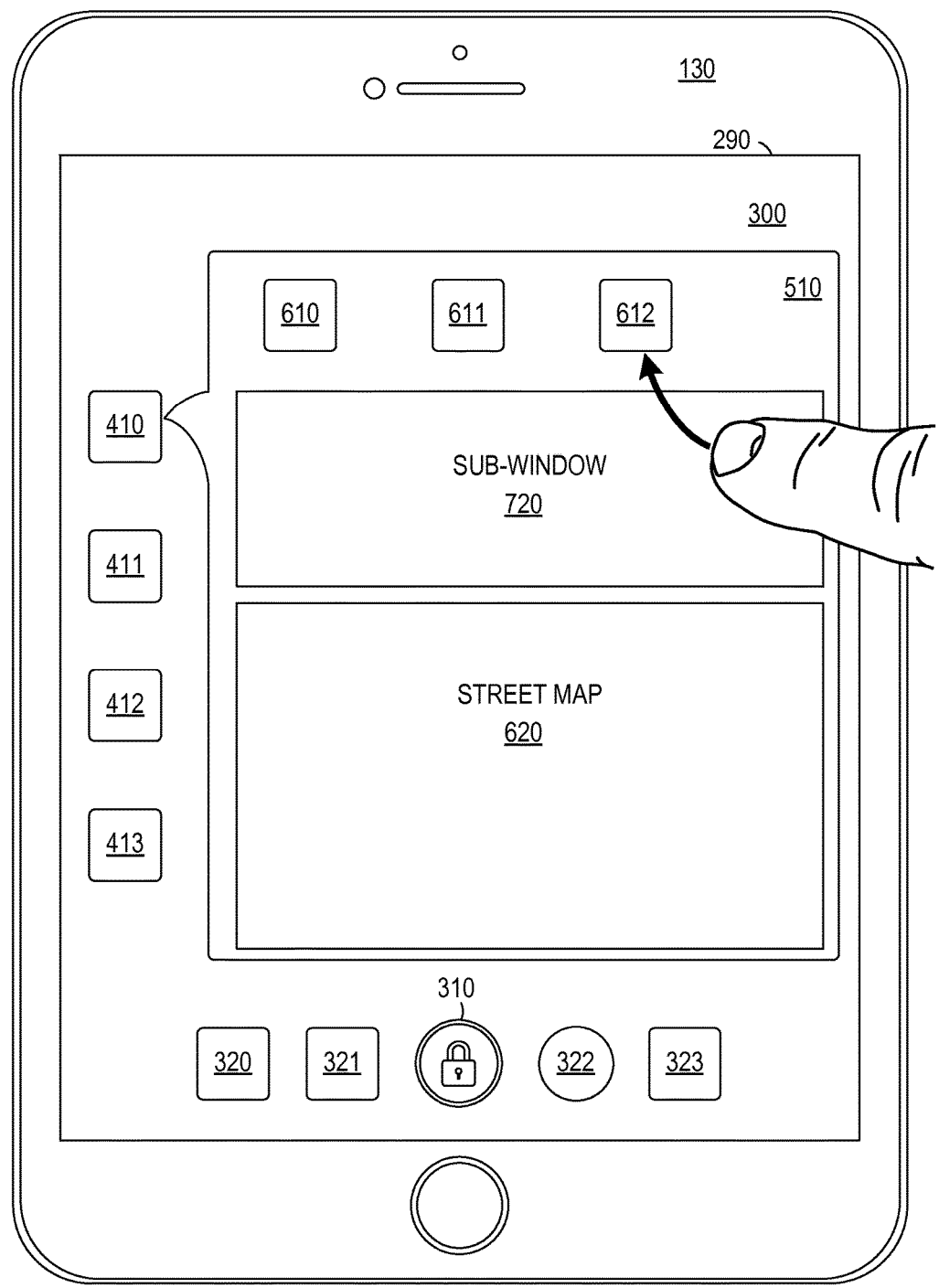

FIGS. 6-8 depict various contents of the pop-up window 510, according to various example embodiments. As shown in FIG. 6, the pop-up window 510 may include one or more application icons 610, 611, and 612, as well as a street map 620, all of which may be displayed (e.g., superimposed over the lock screen 300) while the device 130 is still in its locked state. In the example illustrated in FIG. 6, the application icons 610, 611, and 612 have been selected by the interaction module 230 from a larger set of application icons available (e.g., stored) on the device 130 (e.g., in one or more home screens, which may be predetermined by the operating system 270 of the device 130, by the applications 250, or any suitable combination thereof). Each of the displayed application icons 610-612 visually indicates and corresponds to a different application stored (e.g., installed) on the device 130 (e.g., among the applications 250). Thus, application icons (e.g., application icon 610) are distinct from activity icons (e.g., activity icon 410) in that application icons visually indicate and correspond to executable applications while activity icons visually indicate and correspond to user activities. The selection of these application icons 610-612 may be based on the activity that corresponds to the operated activity icon 410 (e.g., the detected current activity of the user 132).

When displayed in one or more home screens, these application icons 610-612 are each operable to cause the device 130 to execute a corresponding application while the device 130 is in its unlocked state. However, when displayed in the pop-up window 510, these application icons 610-612 are each operable to cause the device 130 to exit the locked state, enter the unlocked state, and execute the corresponding application.

The street map 620 may be or include a geographical map of locations near (e.g., centered on) the geographical location of the device 130 (e.g., as determined by a geolocation component within the device 130). The street map 620 may further include one or more marks (e.g., markers, pins, or highlights) that have been determined by the interaction module 230 to be relevant for the detected current activity of the user 132. Accordingly, supposing that the current activity is driving to work (e.g., as confirmed by the user 132 by tapping on the corresponding activity icon 410), the street map 620 may display highlights or other marks that indicate a route that the user 132 frequently travels to work (e.g., as determined by the interaction module 230 based on historical usage data stored on the device 130).

FIG. 7 shows the pop-up window 510 including a sub-window 720 of content (e.g., a card or other graphical elements suitable for displaying content), instead of the street map 620. FIG. 8 shows the pop-up window 510 containing both the street map 620 and the sub-window 720 of content. The interaction module 230 may generate and display the sub-window 720 by invoking execution of one or more applications stored (e.g., installed) on the device 130 with one or more inputs determined based on the detected current activity of the user 132.

For example, supposing that the detected current activity is driving to work, the sub-window 720 may include one or more reminders of tasks that the user 132 has scheduled for performance at work (e.g., retrieved from a calendar application of the user 132, with "work" as an input, such as a filter parameter). As another example, supposing that the detected current activity is attending a meeting, and the meeting is scheduled to end shortly (e.g., as indicated by the calendar application of the user 132), the sub-window 720 may include one or more restaurant reviews (e.g., retrieved from a third-party website or from the server machine 110). These restaurant reviews may be obtained based on various inputs determined from the detected current activity (e.g., attending the meeting), such as information about other attendees of the meeting (e.g., retrieved from a calendar application, a contacts database, or both), the location of the device 130 (e.g., as determined by a geolocation component of the device 130), historical usage data stored on the device 130, a user preference corresponding to the user 132, or any suitable combination thereof.

As shown in FIG. 8, the lock screen GUI may be configured to enable the user 132 (e.g., represented in FIG. 8 by a finger) to use the output of one application (e.g., first application) as an input to another application (e.g., a second application). In the example embodiment illustrated in FIG. 8, the interaction module 230 has generated and displayed the sub-window 720 of content by executing a first application that corresponds to the application icon 610. As noted above, execution of this first application may be based on one or more inputs determined (e.g., by the interaction module 230) based on the detected current activity of the user 132. Thus, the sub-window 720 contains content obtained (e.g., retrieved, generated, or otherwise accessed) based on the detected current activity. By dragging the sub-window 720 towards (e.g., to) another application icon (e.g., application icon 612, as illustrated in FIG. 8 by a curved arrow), the user 132 can invoke a second application that corresponds to the application icon 612. In this invocation, however, the interaction module 230 may determine one or more inputs based on the content of the sub-window 720. Accordingly, content obtained from the first application may be used as input to the second application.

As an illustrative example, suppose the detected current activity of the user 132 is driving home from work, and the interaction module 230 has generated the sub-window 720 to include a reminder of a task scheduled to be performed after arriving home (e.g., obtained from a task application, which may be visually indicated by and correspond to the application icon 610). As shown in FIG. 8, the street map 620 may also be displayed in the pop-up window 510 and, for example, indicate a route through traffic to guide the user 132 home from work. Further suppose that the task whose reminder appears in the sub-window 720 is "get dinner for family" and that the application icon 612 visually indicates and corresponds to a restaurant review application stored on the device 130.

Continuing this illustrative example, if the user 132 drags the sub-window 720 to the application icon 612, the interaction module 230 causes the restaurant review application to be invoked (e.g., executed) with the location of the user's 132 home and the keywords "dinner" and "family" as input. As a result, the device 130 exits its locked state, enters its unlocked state, and executes the restaurant review application with input data determined (e.g., by the interaction module 230) based on the contents of the sub-window 720. As previously noted, the contents of the sub-window 720 were previously obtained (e.g., by the interaction module 230) based on output of a different application (e.g., the task application that corresponds to the application icon 610). This may have the effect of providing the user 132 with a quick and convenient way (e.g., by a single drag gesture) to unlock the device 130 and begin using the restaurant review application in a contextually relevant manner.

Figure 9:
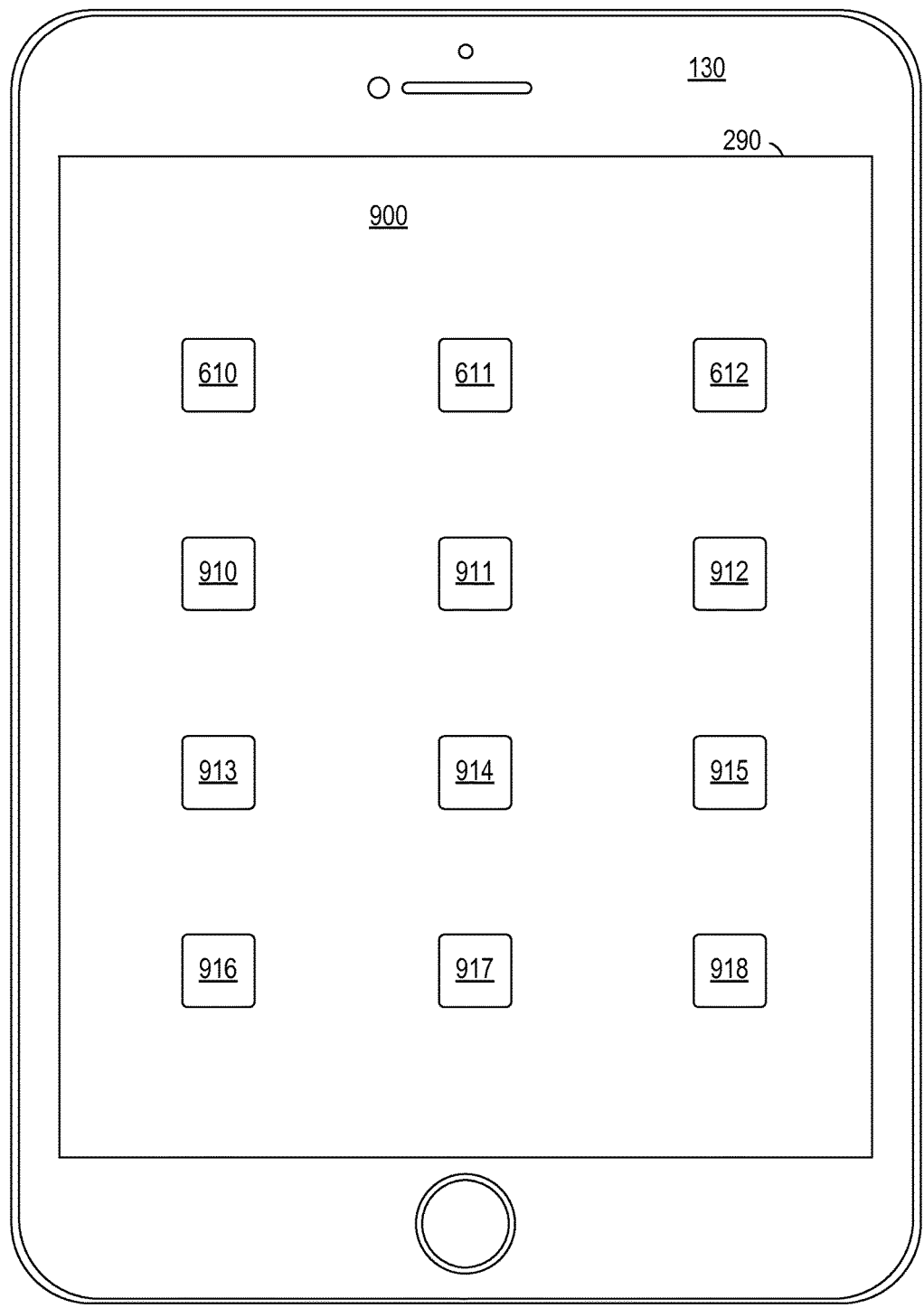
FIGS. 9 and 10 are device diagrams illustrating the screen of the device and illustrating a home screen suitable for use with the lock screen GUI, according to some example embodiments.
Figure 10:
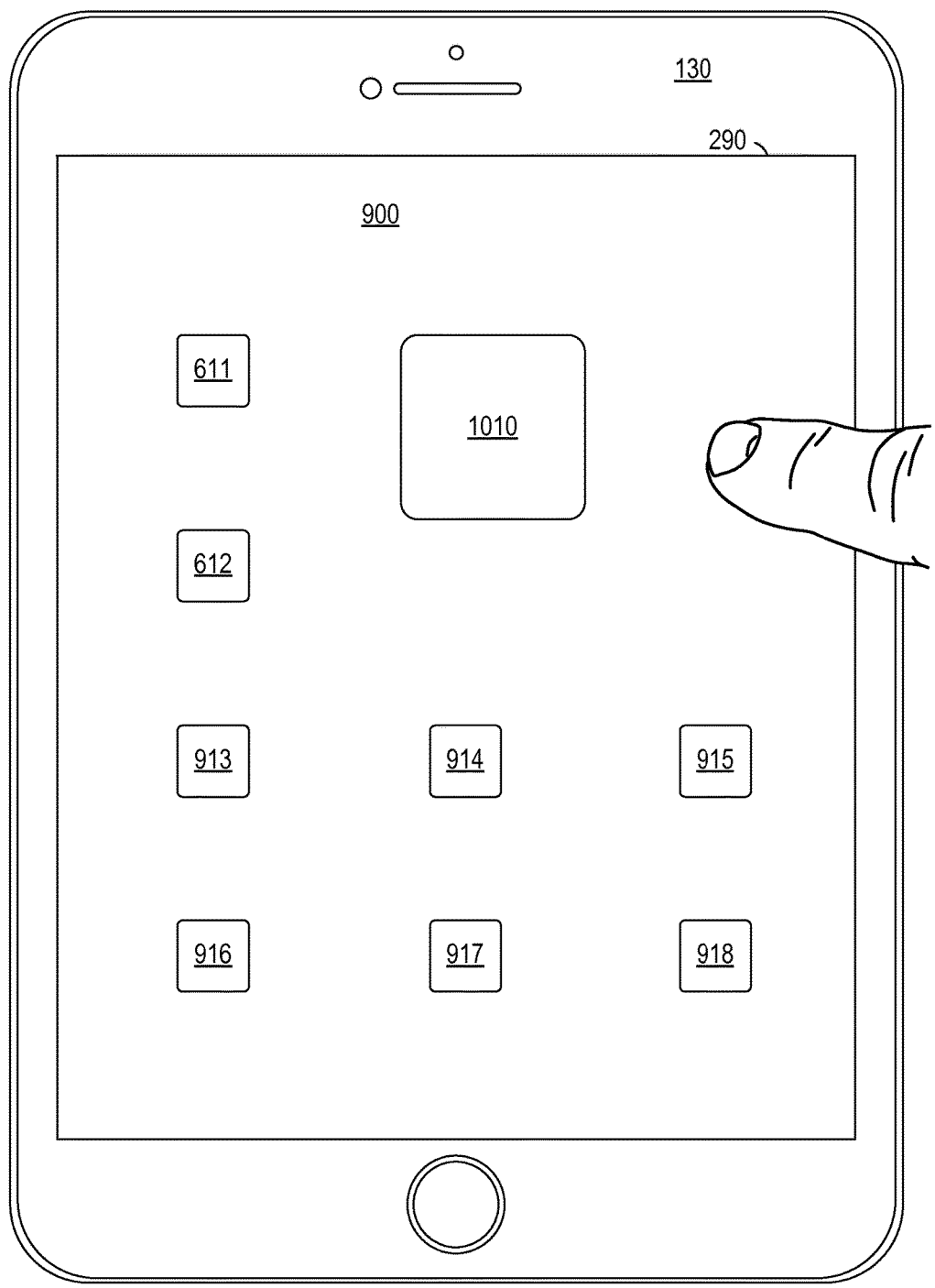

FIGS. 9 and 10 are device diagrams illustrating the screen 290 of the device 130 and illustrating a home screen 900 suitable for use with the lock screen GUI, according to some example embodiments. As noted above, the lock screen 300 prevents the user 132 from accessing the home screen 900 while the device 130 is in its locked state. However, while the device 130 is in its unlocked state, the home screen 900 may be displayed on the screen 290 to enable the user 132 to access one or more of the application icons 610, 611, and 612, which are previously discussed above with respect to FIGS. 6-8, as well as additional application icons 910, 911, 912, 913, 914, 915, 916, 917, and 918. As previously mentioned, each of the application icons 610-612 and 910-918 may respectively correspond to a different application that is stored (e.g., installed) and executable on the device 130. Operation of any of these application icons 610-612 and 910-918 (e.g., by tapping) may invoke or otherwise begin execution of the corresponding application on the device 130 (e.g., by one or more of the processors 299 of the device 130). In various example embodiments, the home screen 900 is generated by the operating system 270 of the device 130 (e.g., as a default layout of the application icons 610-612 and 910-918).

As shown in FIG. 10, some example embodiments of the home screen 900 are modifiable by the home screen module 240 (e.g., within the app 200). In particular, the home screen module 240 may select or otherwise determine a subset of the application icons 610-612 and 910-918 into a group (e.g., folder) of icons, and this group may be represented in the home screen 900 by a folder icon 1010. For example, the home screen module 240 may determine that at least the application icons 610, 910, 911, and 912 are included in a group of icons (e.g., based on their respectively corresponding applications having similar frequencies of usage during the detected current activity of the user 132), and the home screen module 240 may generate and display the folder icon 1010 (e.g., to collectively represent at least the application icons 610, 910, 911, and 912 included in the group) or otherwise cause the folder icon 1010 to be displayed on the home screen 900 (e.g., by modifying the home screen 900).

Figure 11:
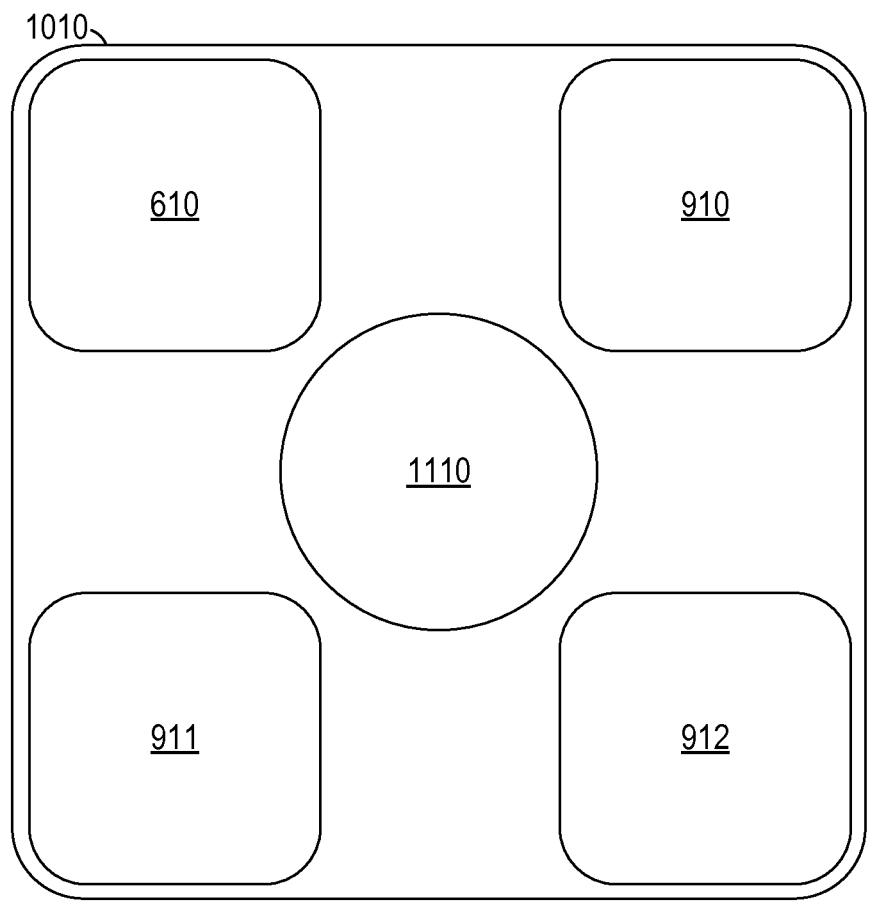
FIG. 11 is a diagram illustrating a folder icon within the home screen of FIG. 10, according to some example embodiments.

FIG. 11 is a diagram illustrating the folder icon 1010 being displayed within the home screen 900, according to some example embodiments. The folder icon 1010 is generated by the home screen module 240 based on the application icons (e.g., at least application icons 610, 910, 911, and 912) that were determined to be members of the group represented by the folder icon 1010. For example, the home screen module 240 may determine that a group of twelve application icons is to be represented by the folder icon 1010 (e.g., based on their corresponding applications being frequently used during the detected current activity) and that the four most often invoked applications correspond to the application icons 610, 910, 911, and 912. Based on this determination, the home screen module 240 may generate and display the folder icon 1010 as including the application icons 610, 910, 911, and 912, or smaller sized versions thereof. Accordingly, FIG. 11 shows the application icons 610, 910, 911, and 912 as being contained within the folder icon 1010.

Within the folder icon 1010, each of the application icons 610, 910, 911, and 912 may be individually operated by the user 132. For example, to invoke the application that corresponds to the application icon 610 (e.g., a task application), the user 132 can tap on the upper left region of the folder icon 1010 (e.g., within the borders of the application icon 610, as it appears within the folder icon 1010). Likewise, to invoke the application that corresponds to the application icon 910 (e.g., a messaging application), the user 132 can tap on the upper right region of the folder icon 1010 (e.g., within the borders of the application icon 910, as it appears within the folder icon 1010). Similarly, the application that corresponds to the application icon 911 may be invoked by tapping on the lower left region of the folder icon 1010 (e.g., within the borders of the application icon 911, as it appears within the folder icon 1010), and the application that corresponds to the application icon 912 may be invoked by operating the lower right reach of the folder icon and 10 (e.g., within the borders of the application icon 912, as it appears within the folder icon 1010). Thus, although the application icons 610, 910, 911, and 912 have been grouped by the home screen module 240 into the folder icon 1010, each of the application icons 610, 910, 911, and 912 remain individually accessible and operable from the home screen 900, for example, compared to troubling the user 132 to open, view, or otherwise access the group (e.g., folder) of application icons represented by the folder icon 1010 before operating one of those application icons.

As shown in FIG. 11, the folder icon 1010 may also include a folder view icon 1110, which may be centrally located within the folder icon 1010. According to various example embodiments, the folder view icon 1110 may be visible (e.g., colored in contrast to the background of the folder icon 1010) or nonvisible (e.g., colored the same as the background of the folder icon 1010). The folder view icon 1110 is operable (e.g., via tapping) by the user 132 to open, view, or otherwise access the group of icons represented by the folder icon 1010 (e.g., in their entirety). Accordingly, while viewing the home screen 900, the user 132 can choose whether to directly invoke an application represented by one of the included application icons 610, 910, 911, and 912, as well as whether to access the full group of activity icons to which the application icons 610, 910, 911, and 912 belong.

Figure 12:
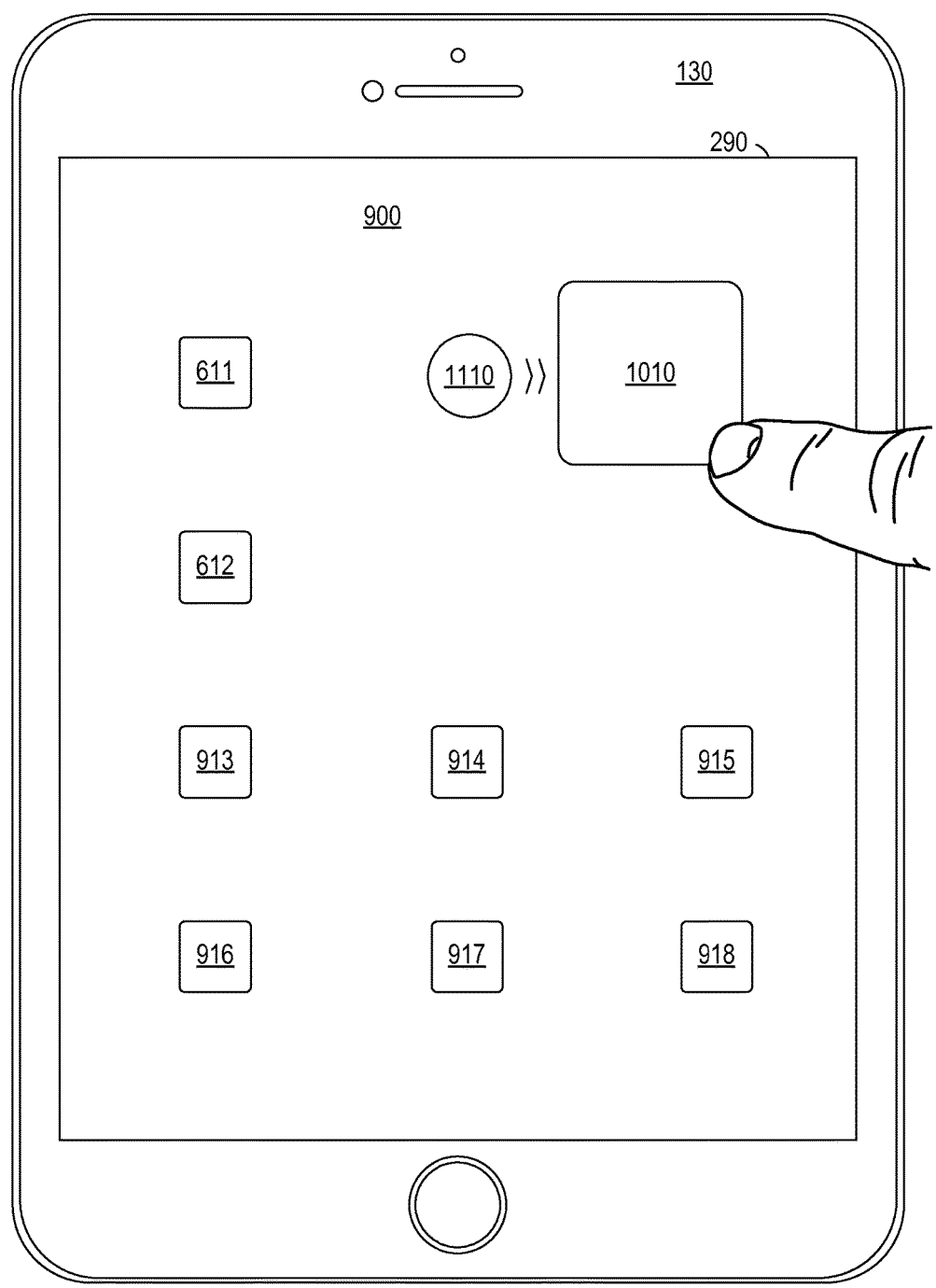
FIG. 12 is a device diagram illustrating the screen of the device illustrating a home screen suitable for use with the lock screen GUI, according to some example embodiments.

FIG. 12 is a device diagram illustrating the screen 290 of the device 130 illustrating the home screen 900, according to some example embodiments. In the example embodiments depicted in FIG. 12, the folder view icon 1110 is external to the folder icon 1010, and both the folder view icon 1110 and the folder icon 1010 are shown in the home screen 900. In such situations, the home screen module 240 may generate the folder view icon 1110 (e.g., as a visible icon distinguishable from the background of the home screen 900) and the folder icon 1010 as all or part of a combination (e.g., a matched pair) of icons.

As described above, the folder view icon 1110 is operable (e.g., via tapping) by the user 132 to open, view, or otherwise access the group of icons represented by the folder icon 1010. As also described above, the folder icon 1010 may enable individual access to, and operation of, the application icons 610, 910, 911, and 912 (e.g., directly from the home screen 900, without opening, viewing, or otherwise accessing the group of icons represented by the folder icon 1010). However, in the example embodiments depicted in FIG. 12, the folder icon 1010 may omit the folder view icon 1110, and the four application icons 610, 910, 911, and 912 may constitute the full contents of the folder icon 1010. This is illustrated in FIG. 13.

Figure 13:
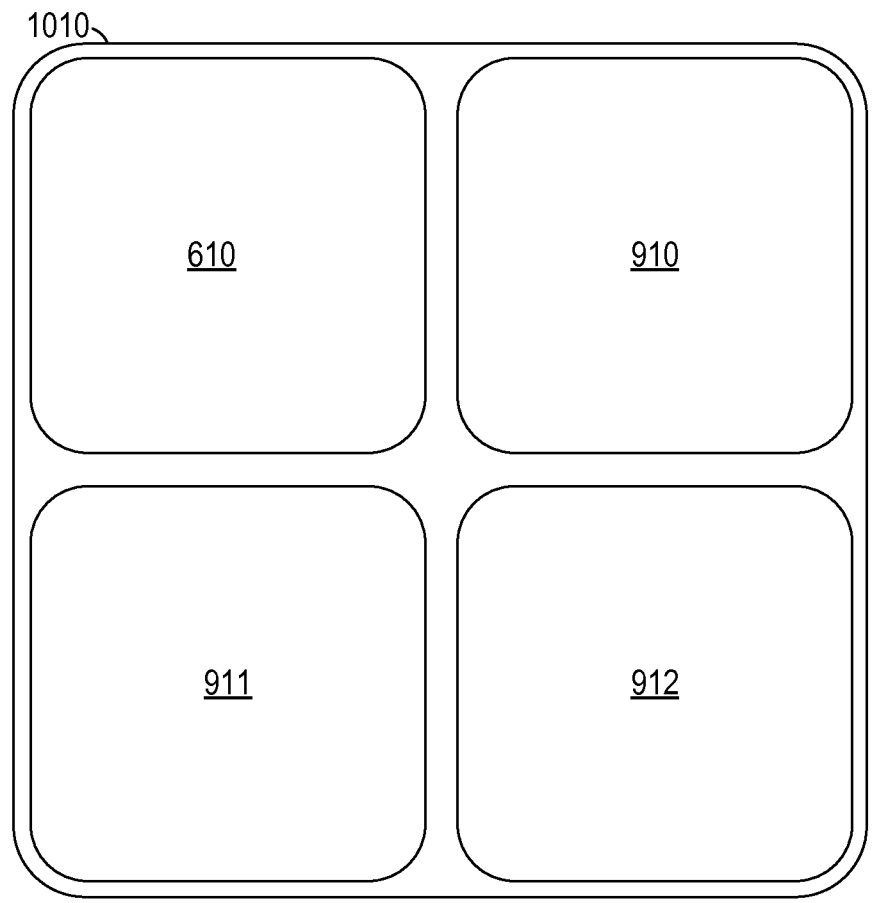
FIG. 13 is a diagram illustrating a folder icon within the home screen of FIG. 12, according to some example embodiments.

FIG. 13 is a diagram illustrating the folder icon 1010 within the home screen 900, according to the example embodiments discussed above with respect to FIG. 12. Since the folder view icon 1110 appears external to the folder icon 1010 in the home screen 900, as shown in FIG. 12, the application icons 610, 910, 911, 912, or smaller sized versions thereof, may occupy the folder icon 1010 as shown in FIG. 13. As noted above, within the folder icon 1010, each of the application icons 610, 910, 911, and 912 may be individually operated by the user 132 to invoke (e.g., execute) the corresponding application on the device 130.

Figure 14:
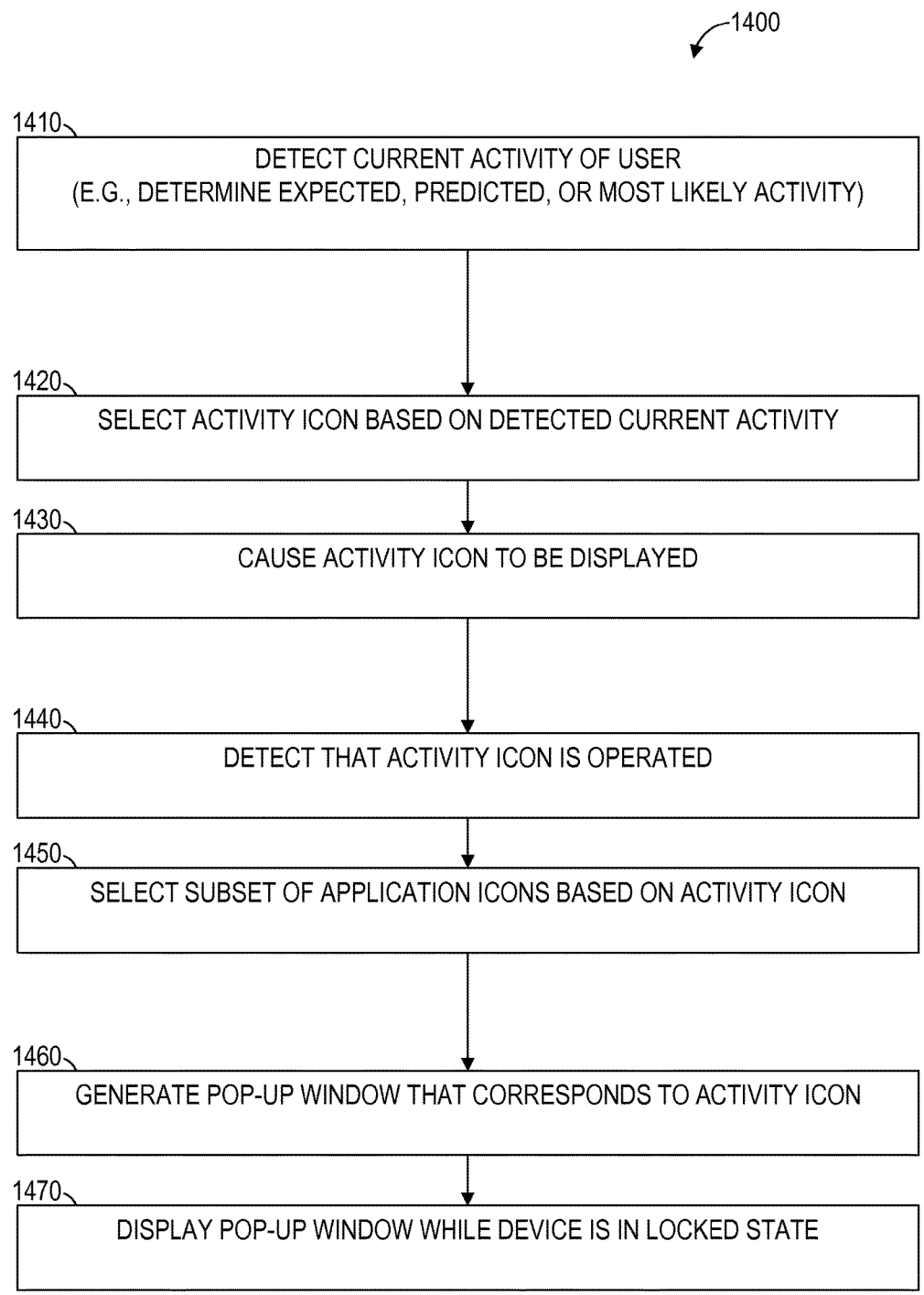
FIGS. 14-17 are flowcharts illustrating operations of the device in performing a method of providing the lock screen GUI, according to some example embodiments.

FIGS. 14-17 are flowcharts illustrating operations of the device 130 in performing a method 1400 of providing the lock screen GUI, according to some example embodiments. Operations in the method 1400 may be performed by the device 130 (e.g., in executing the app 200), using modules described above with respect to FIG. 2. As shown in FIG. 14, the method 1400 includes operations 1410, 1420, 1430, 1440, 1450, 1460, and 1470.

In operation 1410, the detection module 210 detects the current activity of the user 132, while the device 130 is in its locked state. As noted above, this may be performed by determining an expected, predicted, inferred, or most likely activity in which the user 132 is currently engaged, and this detection may be fully or partially based on context data generated by the sensors 260 within the device 130. In some example embodiments, the detection is further based on historical usage data stored by the device 130 (e.g., a log of activity data, such as a record of most frequently invoked applications). In certain example embodiments, the detection is further based on a preference of the user 132 (e.g., stored in a user-created or automatically created user profile that corresponds to the user 132). In some example embodiments, the detection module 210 may be referred to as an activity module (e.g., configured to detect the current activity of the user 132).

In operation 1420, the icon module 220 selects one or more activity icons (e.g., activity icon 410) for display in the lock screen GUI, based on the current activity detected in operation 1410. For example, the activity icons 410-413 may be selected from a larger set of activity icons available on the device 130 (e.g., stored in the icon module 220 or elsewhere in the app 200). Accordingly, this may have the effect of automatically (e.g., by machine) and dynamically (e.g., in real time) identifying, selecting, choosing, specifying, or otherwise determining one or more activity icons (e.g., activity icons 410-413) based on (e.g., in response to) the current activity of the user 132 (e.g., as detected in operation 1410).

In operation 1430, the icon module 220 causes the selected one or more activity icons (e.g., activity icons 410-413) to be displayed on the screen 290 of the device 130, while the device 130 is in its locked state. As noted above with respect to FIG. 4, the selected and displayed activity icons 410-413 may be superimposed over the lock screen 300 or integrated into the lock screen 300.

In operation 1440, the interaction module 230 detects that an activity icon (e.g., activity icon 410) displayed in operation 1430 has been operated (e.g., by tapping or by some other selection process available to the user 132). For example, the activity icon 410 may be tapped by the user 132, and the interaction module 230 may detect this tap as operation of the activity icon 410. As noted above, this detection is performed while the device 130 is still in its locked state.

In operation 1450, the interaction module 230 selects a subset of the application icons that are available on the device 130 (e.g., stored in the operating system 270, in the applications 250, or any suitable combination thereof). As noted above with respect to FIG. 6, the application icons 610-612 may be selected by the interaction module 230 for inclusion in the subset. In addition, the selection of these application icons 610-612 may be based on the current activity detected in operation 1410 and may occur while the device 130 is still in its locked state. In various example embodiments, the selection of the subset is performed automatically (e.g., by machine) and dynamically (e.g., in real-time) based on the current activity of the user 132 (e.g., as detected in operation 1410).

In operation 1460, the interaction module 230 generates the pop-up window 510 (e.g., to have an appearance as discussed above with respect to FIGS. 6-8). According to various example embodiments, performance of operation 1460 includes determining and accessing (e.g., creating, retrieving, or otherwise obtaining) contents of the pop-up window 510. For example, generation of the pop-up window 510 may include incorporating the application icons 610-612 that were selected in operation 1450 into the generated pop-up window 510. In various example embodiments, operation 1460 is performed automatically (e.g., by machine) and dynamically (e.g., in real-time).

In operation 1470, the interaction module 230 causes the generated pop-up window 510 to be displayed on the screen 290 of the device 130, while the device 130 is still in its locked state. As noted above, the pop-up window 510 may be displayed contemporaneously (e.g., simultaneously) with the activity icons previously displayed in operation 1430, and the pop-up window 510 may include the application icons 610-612 that were selected in operation 1450. Accordingly, this displaying of the pop-up window 510 results in displaying the selected subset of application icons (e.g., application icons 610-612) and enabling operation of these application icons while the device 130 is still in its locked state.

Figure 15:
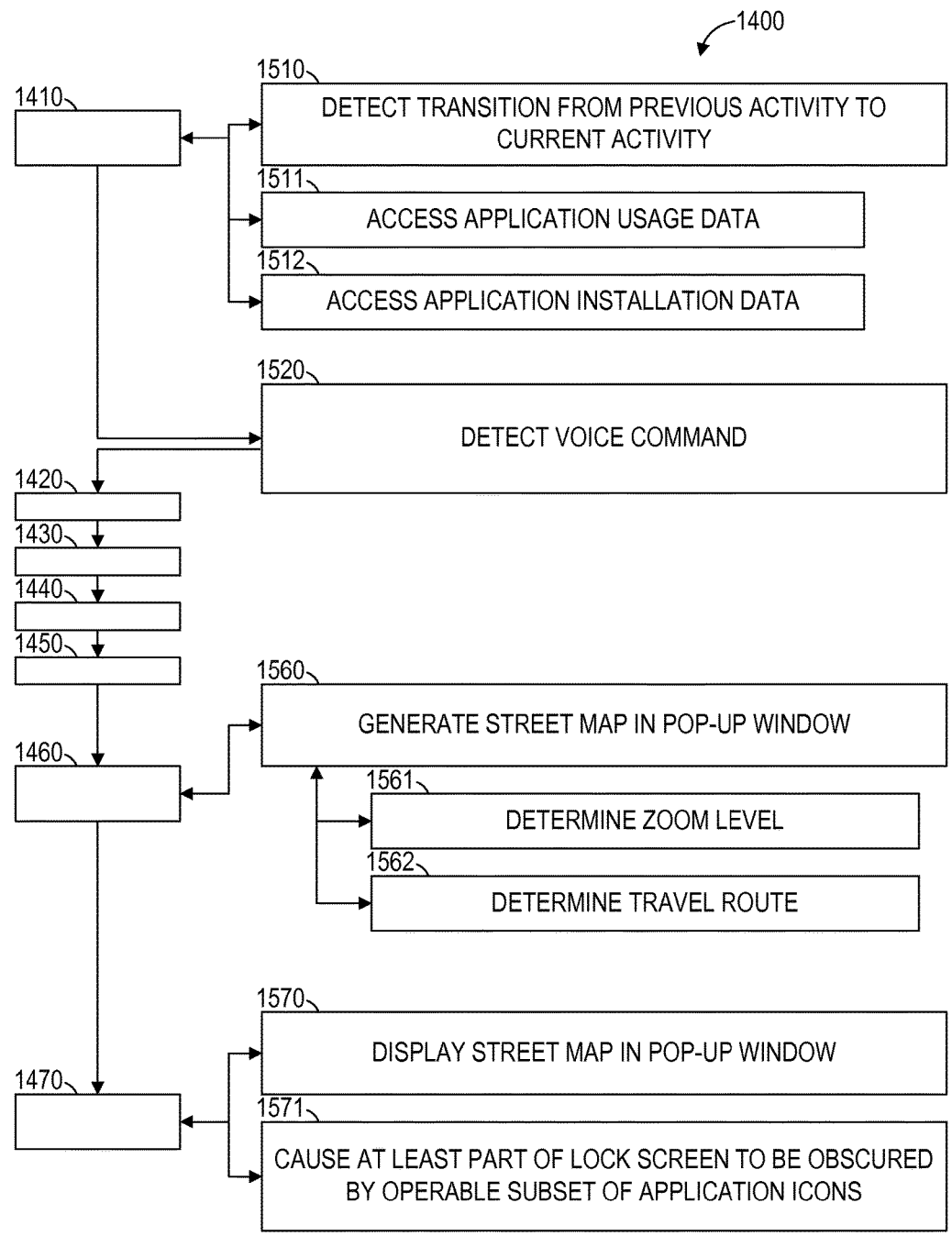

As shown in FIG. 15, the method 1400 may include one or more of operations 1510, 1511, 1512, 1520, 1560, 1561, 1562, 1570, and 1571, according to various example embodiments. One or more of operations 1510, 1511, and 1512 may be performed as part (e.g., a precursor task, a subroutine, or a portion) of operation 1410, in which the detection module 210 detects the current activity of the user 132 while the device 130 is in its locked state.

In operation 1510, the detection module 210 detects a transition to the current activity from a previous activity in which the user 132 was engaged. This may be performed by detecting a relatively rapid change in the context data generated by the sensors 260 within the device 130 (e.g., sudden increase or decrease in movement, ambient noise, recognized voices, temperature, or any suitable combination thereof). This may have the effect of allowing the detection module 210 to perform operation 1510 at or near the beginning of the current activity of the user 132 (e.g., at or near the outset of a recently started current activity).

In operation 1511, the detection module 210 accesses application usage data that indicates executions of applications by the device 130, terminations of applications on the device 130, or any suitable combination thereof. This application usage data may be stored by the device 130 (e.g., in the operating system 270, in the applications 250, or any suitable combination thereof), and the application usage data accordingly may be accessed from the device 130. In some example embodiments, the application usage data is stored by the server machine 110 or the database 115 and accordingly accessed therefrom. In example embodiments that include operation 1511, the detecting of the current activity in operation 1410 is based on the application usage data accessed in operation 1511.

In operation 1512, the detection module 210 accesses application installation data that indicates installations of applications on the device 130, removals of applications from the device 130, or any suitable combination thereof. This application installation data may be stored by the device 130 (e.g., in the operating system 270, in the applications 250, or any suitable combination thereof), and the application installation data accordingly may be accessed from the device 130. In some example embodiments, the application installation data is stored by the server machine 110 or the database 115 and accordingly accessed therefrom. In example embodiments that include operation 1512, the detecting of the current activity in operation 1410 is based on the application installation data accessed in operation 1512.

In operation 1520, the detection module 210 detects a voice command (e.g., spoken by the user 132) while the device 130 is in its locked state. In example embodiments that include operation 1520, the causing of the activity icons (e.g., activity icons 410-413) selected in operation 1420 to be displayed in operation 1430 is responsive to the voice command detected in operation 1520. For example, the voice command may be or include the phrase "Help me" or the phrase "I need help with this," and the icon module 220 may perform one or both of operations 1420 and 1430 in response to the voice command.

Operation 1560 may be performed as part of operation 1460, in which the interaction module 230 generates the pop-up window 510 (e.g., including some or all of its contents), while the device 130 is in its locked state. In operation 1560, the interaction module 230 generates the street map 620 (e.g., to have an appearance as discussed above with respect to FIGS. 6-8). As noted above, the generation of the street map 620 may be based on the current activity detected in operation 1410.

One or more of operations 1561 and 1562 may be performed as part of operation 1560. In operation 1561, the interaction module 230 determines a zoom level of the street map 620 (e.g., a simulated altitude or a ratio of geographical distance to pixel distance). The determination may be based on the current activity detected in operation 1410.

In operation 1562, the interaction module 230 determines a travel route from a start location to an end location (e.g., a path that follows one or more streets or other routes usable for travel between the start and end locations) indicated on the street map 620. The travel route may be determined based on the current activity detected in operation 1410. In addition, the travel route may be visually marked (e.g., highlighted) in the street map 620 (e.g., using one or more highlights, such as colors, levels of brightness, line weights, or blinking graphical elements).

One or both of operations 1570 and 1571 may be performed as part of operation 1470, in which the interaction module 230 displays the pop-up window 510 while the device 130 is in its locked state. In operation 1570, the street map 620 generated in operation 1560 is incorporated into the pop-up window 510 (e.g., as shown in FIGS. 6 and 8) and displayed as part of the pop-up window 510. The incorporation of the street map 620, the display of the street map 620, or both, may be based on the current activity detected in operation 1410.

In operation 1571, the interaction module 230 causes at least part of the lock screen 300 to be obscured by the operable subset of application icons (e.g., application icons 410-413) selected in operation 1450, while the device 130 is in its locked state. For example, the interaction module 230 may superimpose the application icons 410-413 (e.g., as selected in operation 1450) over a portion of the lock screen 300 (e.g., as shown in FIGS. 4-8). In alternative example embodiments, the interaction module 230 modifies the lock screen 300 itself (e.g., by inserting or otherwise incorporating the application icons 410-413 into the lock screen 300), in which case nothing is superimposed on the modified lock screen 300 (e.g., the modified lock screen 300 is not obscured).

Figure 16:
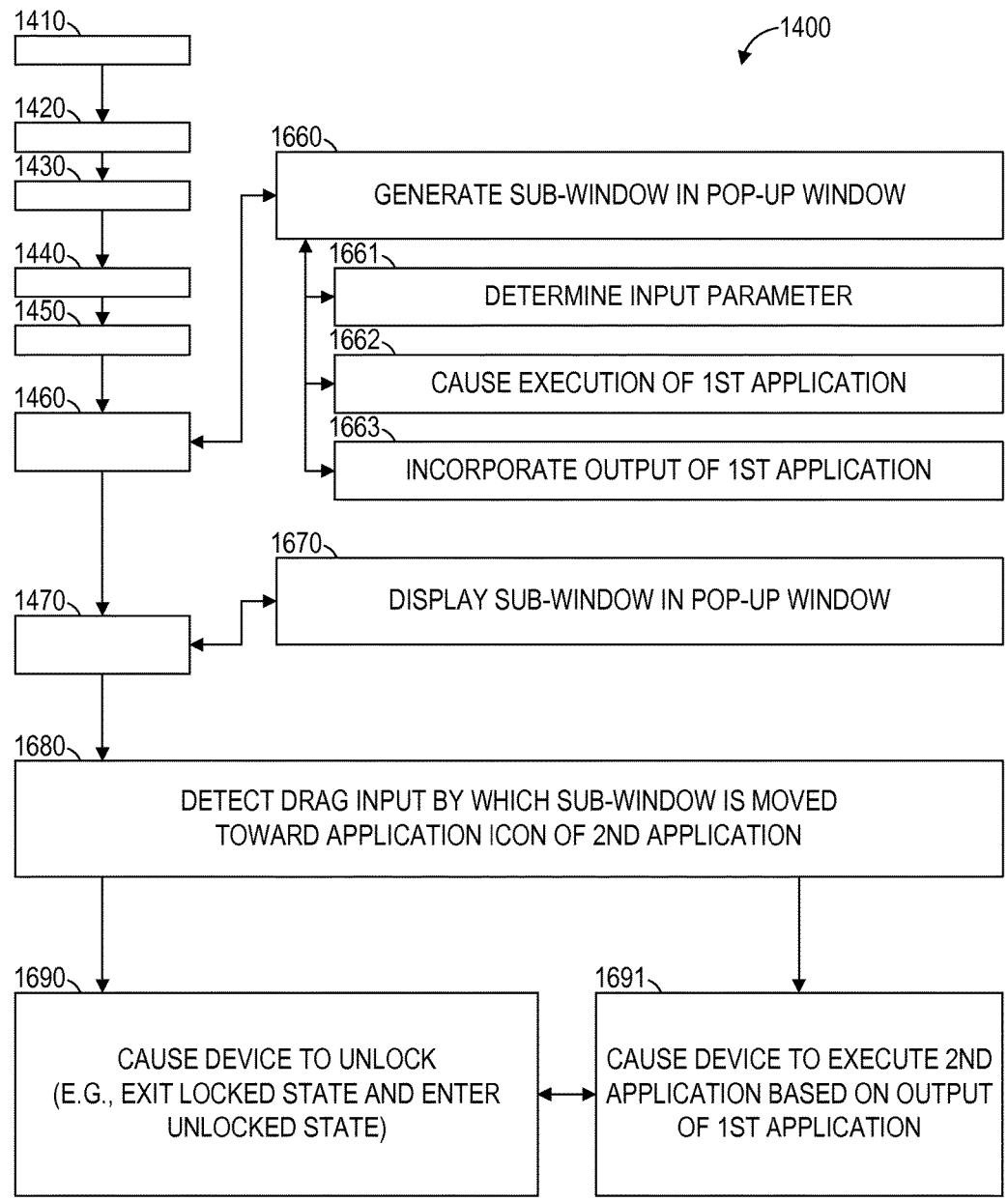

As shown in FIG. 16, the method 1400 may include one or more of operations 1660, 1661, 1662, 1663, 1670, 1680, 1690, and 1691. Operation 1660 may be performed as part (e.g., a precursor task, a subroutine, or a portion) of operation 1460, in which the interaction module 230 generates the pop-up window 510 (e.g., including some or all of its contents), while the device 130 is in its locked state. In operation 1660, the interaction module 230 generates the sub-window 720 of content (e.g., to have an appearance as discussed above with respect to FIGS. 7 and 8). As noted above, the generation of the sub-window 720 of content may be based on the current activity detected in operation 1410. For example, the interaction module 230 may retrieve content from the server machine 110 based on the current activity that was detected in operation 1410. This retrieval may further be based on a current location of the device 130 (e.g., as detected by one or more of the sensors 260 in the device 130), and this retrieval may be performed while the device 130 is still in its locked state. Accordingly, the interaction module 230 may incorporate the retrieved content (e.g., obtained based on the current activity and the current location) into the sub-window 720 of content.

One or more of operations 1661, 1662, and 1663 may be performed as part of operation 1660. In operation 1661, the interaction module 230 determines an input parameter usable as input into an application that corresponds to the application icon 610 (e.g., a task application) selected for inclusion in the pop-up window 510. The determination of the input parameter may be based on the current activity detected in operation 1410. For example, suppose the current activity is driving home from work, and further suppose that the interaction module 230 has already selected the application icon 610, which may correspond to a task application, for inclusion in the pop-up window 510. In such a situation, the interaction module 230 may perform operation 1661 by determining that the input parameter is the location of the home to which the user 132 is driving.

In operation 1662, the input parameter determined in operation 1661 is provided by the interaction module 230 to the task application that corresponds to the application icon 610 in order to retrieve or otherwise obtain one or more reminders of tasks that are scheduled to be performed after arriving home. For example, the interaction module 230 may invoke (e.g., execute) the task application based on the input parameter (e.g., the location of the home of the user 132). This may also have the effect of causing the device 130 to execute the task application while the device 130 is still in its locked state.

In operation 1663, one or more outputs of the task application (e.g., a first application) executed in operation 1662 (e.g., with the input parameter determined in operation 1661) are incorporated by the interaction module 230 into the sub-window 720 of content. Accordingly, continuing the previous example, the obtained one or more reminders of tasks scheduled to be performed after arriving home may thus be included in the sub-window 720 of content and hence displayed in the pop-up window 510 when operation 1470 is performed.

Operation 1670 may be performed as part of operation 1470, in which the interaction module 230 displays the pop-up window 510, while the device 130 is in its locked state. In operation 1670, the sub-window 720 generated in operation 1660 is incorporated into the pop-up window 510 (e.g., as shown in FIGS. 7 and 8) and displayed as part of the pop-up window 510. The incorporation of the sub-window 720, the display of the sub-window 720, or both, may be based on the current activity detected in operation 1410.

As noted above, one or more outputs of a first application (e.g., the task application) may be submitted by the user 132 as input to a second application (e.g., a restaurant review application) within the locked screen GUI. For example, as discussed above with respect to FIG. 8, suppose that the sub-window 720 includes a reminder for the user 132 to "get dinner for family" after arriving home and that the application icon 612 visually indicates and corresponds to a restaurant review application stored on the device 130. In such a situation, the user 132 can drag the sub-window 720 to the application icon 612 displayed on the screen 290 of the device 130, and the interaction module 230 will cause another application (e.g., a restaurant review application) to be invoked with the location of the user's 132 home and the keywords "dinner" and "family" as input.

In operation 1680, the interaction module 230 detects this drag input by which the sub-window 720 is moved toward (e.g., to) the application icon 612, while the device 130 is in its locked state. Continuing the above example, the application icon 612 may correspond to a restaurant review application that the user 132 wishes to invoke using input from the sub-window 720 (e.g., the location of the home of the user 132, the keyword "dinner" from the displayed reminder, and the keyword "family" from the displayed reminder). As shown in FIG. 16, the interaction module 230 may then perform one or both of operation 1690 and 1691, in any order.

In operation 1690, the interaction module 230 causes the device 130 to exit its locked state and enter its unlocked state. As noted above, in the unlocked state, the lock screen 300 is not displayed on the screen 290 of the device 130. Operation 1690 may be performed in response to the detecting of the drag input in operation 1680. This may have the effect of allowing operation 1691 to be performed with the device 130 unlocked (e.g., operating in a normal non-locked mode).

In operation 1691, the interaction module 230 causes the device 130 to invoke (e.g., execute) the restaurant review application (e.g., a second application) that corresponds to the application icon 612 toward (e.g., to) which the user 132 dragged the sub-window 720. As noted above, the restaurant review application may be invoked with one or more input parameters obtained from (e.g., included in) the sub-window 720, such as the location of the home of the user 132, the keyword "dinner" from the displayed reminder, and the keyword "family" from the displayed reminder. Operation 1691 may be performed in response to the detecting of the drag input in operation 1680.

Figure 17:
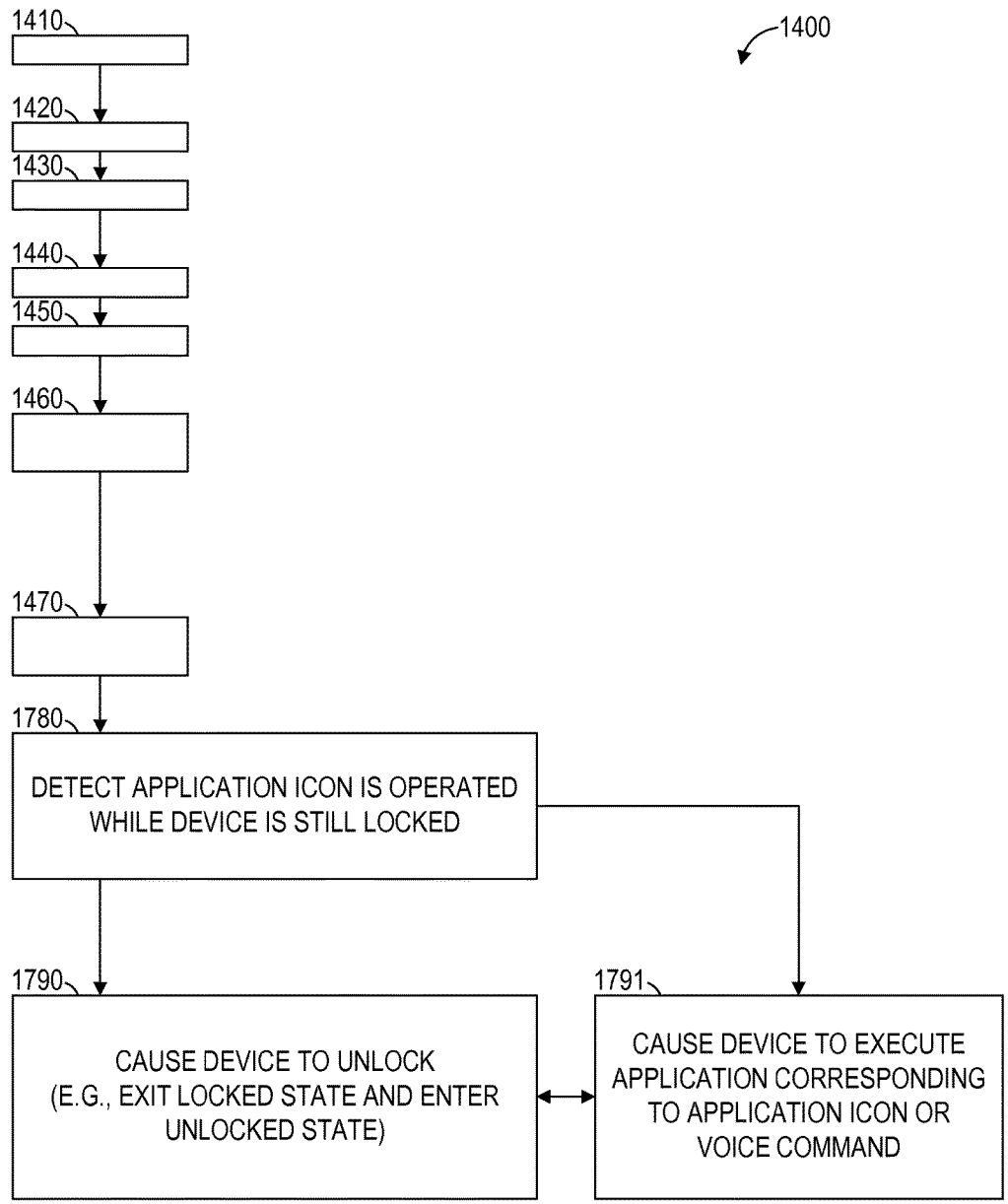

As shown in FIG. 17, the method of 1400 may include one or more of operations 1780, 1790, and 1791. In operation 1780, the interaction module 230 detects that an application icon (e.g., application icon 611) displayed in the pop-up window 510 is operated by the user 132 (e.g., by a tap), while the device 130 is in its locked state. For example, the interaction module 230 may detect operation of the application icon 611, which may correspond to a messaging application. As shown in FIG. 17, the interaction module 230 may then perform one or both of operations 1790 and 1791, in any order.

In operation 1790, the interaction module 230 causes the device 130 to exit its locked state and enter its unlocked state. As discussed above, in the unlocked state, the lock screen 300 is not displayed on the screen 290 of the device 130. Operation 1790 may be performed in response to the detecting of the operation of the application icon 611 in operation 1780. This may have the effect of allowing operation 1791 to be performed with the device 130 unlocked (e.g., operating in a normal non-locked mode).

In operation 1791, the interaction module 230 causes the device 130 to invoke (e.g., execute) the messaging application (e.g., a third application) that corresponds to the application icon 611. Operation 1791 may be performed in response to the detecting of the operation of the application icon 611 in operation 1780.

In some example embodiments, operation 1520 replaces operation 1780. That is, in such example embodiments, performance of operation 1791 (e.g., invoking the messaging application that corresponds to the application icon 611) is triggered by the detecting of the voice command in operation 1520, instead of being triggered by the detecting that the application icon 611 has been operated (e.g., tapped) in operation 1780. For example, the voice command detected in operation 1520 may be or include the phrase "launch messaging app," and this interaction module 230 may perform operation 1791 by invoking the messaging application in response to detection of this voice command.

According to various example embodiments, one or more of the methodologies described herein may facilitate providing a lock screen GUI, including generating and displaying various graphical elements of the lock screen GUI (e.g., as shown and described with respect to FIGS. 4-8) on the screen 290 of the device 130. Thus, one or more of the methodologies described herein may facilitate quick and convenient access to, and invocation of, one or more applications relevant to the current activity of the user 132, while the device 130 is in a locked state (e.g., without unlocking the device 130). Moreover, one or more of the methodologies described herein may facilitate access to, and invocation of, one or more applications from the home screen 900 (e.g., via the folder icon and 1010, as shown and described with respect to FIGS. 9-13). Hence, one or more of the methodologies described herein may facilitate faster, simpler, more relevant, more convenient, and more satisfying usage of the device 130 compared to devices that lack the modules described herein or otherwise are unable to perform the methodologies described herein.

When these effects are considered in aggregate, one or more of the methodologies described herein may obviate a need for certain efforts or resources that otherwise would be involved in providing a lock screen GUI or facilitating the faster, simpler, more relevant, more convenient, and more satisfying usage of the device 130. Efforts expended by a user in accessing and invoking applications on the device 130 may be reduced by use of (e.g., reliance upon) a machine (e.g., device 130) that implements one or more of the methodologies described herein. Computing resources used by one or more machines, databases, or devices (e.g., within the network environment 100) may similarly be reduced (e.g., compared to machines, databases, or devices that lack one or more the methodologies described herein). Examples of such computing resources include processor cycles, network traffic, memory usage, data storage capacity, power consumption, and cooling capacity.

Figure 18:
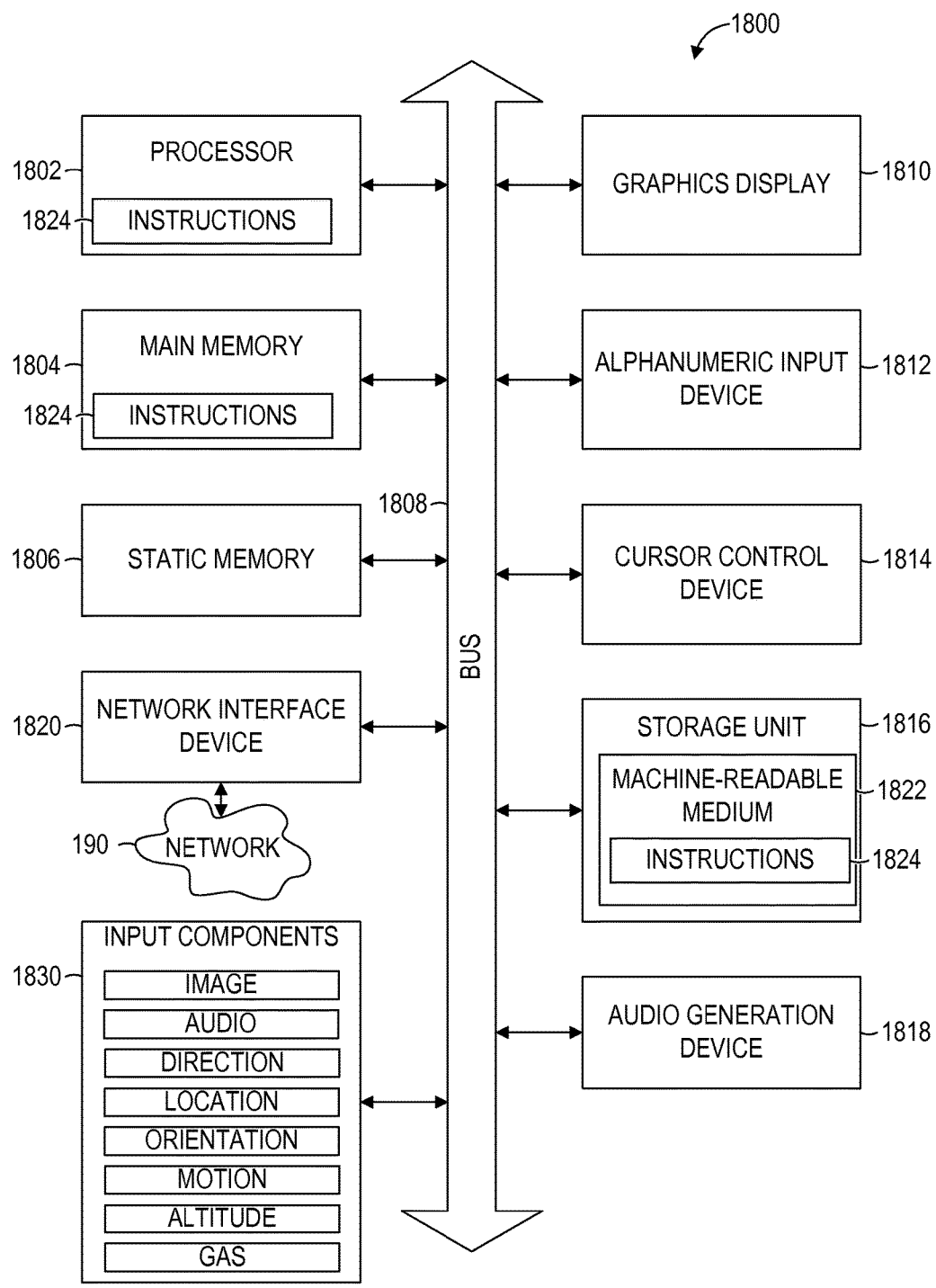
FIG. 18 is a block diagram illustrating components of a machine, according to some example embodiments, able to read instructions from a machine-readable medium and perform any one or more of the methodologies discussed herein.

FIG. 18 is a block diagram illustrating components of a machine 1800, according to some example embodiments, able to read instructions 1824 from a machine-readable medium 1822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 18 shows the machine 1800 in the example form of a computer system (e.g., a computer) within which the instructions 1824 (e.g., software, a program, an application, an applet, an app, or other executable code) for causing the machine 1800 to perform any one or more of the methodologies discussed herein may be executed, in whole or in part.

In alternative embodiments, the machine 1800 operates as a standalone device or may be communicatively coupled (e.g., networked) to other machines. In a networked deployment, the machine 1800 may operate in the capacity of a server machine or a client machine in a server-client network environment, or as a peer machine in a distributed (e.g., peer-to-peer) network environment. The machine 1800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1824, sequentially or otherwise, that specify actions to be taken by that machine. Further, while only a single machine is illustrated, the term "machine" shall also be taken to include any collection of machines that individually or jointly execute the instructions 1824 to perform all or part of any one or more of the methodologies discussed herein.

The machine 1800 includes a processor 1802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1804, and a static memory 1806, which are configured to communicate with each other via a bus 1808. The processor 1802 may contain solid-state digital microcircuits (e.g., electronic, optical, or both) that are configurable, temporarily or permanently, by some or all of the instructions 1824 such that the processor 1802 is configurable to perform any one or more of the methodologies described herein, in whole or in part. For example, a set of one or more microcircuits of the processor 1802 may be configurable to execute one or more modules (e.g., software modules) described herein. In some example embodiments, the processor 1802 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 1800 with at least the processor 1802, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1800 may further include a graphics display 1810 (e.g., a plasma display panel (PDP), a light emitting diode (LED) display, a liquid crystal display (LCD), a projector, a cathode ray tube (CRT), or any other display capable of displaying graphics or video). The graphics display 1810 may form all or part of the screen 290. The machine 1800 may also include an alphanumeric input device 1812 (e.g., a keyboard or keypad), a cursor control device 1814 (e.g., a mouse, a touchpad, a trackball, a joystick, a motion sensor, an eye tracking device, or other pointing instrument), a storage unit 1816, an audio generation device 1818 (e.g., a sound card, an amplifier, a speaker, a headphone jack, or any suitable combination thereof), and a network interface device 1820.

The storage unit 1816 includes the machine-readable medium 1822 (e.g., a tangible and non-transitory machine-readable storage medium) on which are stored the instructions 1824 embodying any one or more of the methodologies or functions described herein. The instructions 1824 may also reside, completely or at least partially, within the main memory 1804, within the processor 1802 (e.g., within the processor's cache memory), or both, before or during execution thereof by the machine 1800. Accordingly, the main memory 1804 and the processor 1802 may be considered machine-readable media (e.g., tangible and non-transitory machine-readable media). The instructions 1824 may be transmitted or received over the network 190 via the network interface device 1820. For example, the network interface device 1820 may communicate the instructions 1824 using any one or more transfer protocols (e.g., hypertext transfer protocol (HTTP)).

In some example embodiments, the machine 1800 may be a portable computing device, such as a smart phone or tablet computer, and have one or more additional input components 1830 (e.g., sensors or gauges). Examples of such input components 1830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1824 for execution by the machine 1800, such that the instructions 1824, when executed by one or more processors of the machine 1800 (e.g., processor 1802), cause the machine 1800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1824 for execution by the machine 1800 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1824).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., apparatus) discussed herein.

A first embodiment provides a method comprising:
by a detection module comprising one or more processors of a device, detecting a current activity in which a user of the device is engaged while the device is in a locked state, the locked state causing a screen of the device to display a lock screen that prevents the user from accessing a set of home screens in which application icons are displayed and operable to initiate executions of applications by the device, the detecting of the current activity being based on context data generated by a set of sensors within the device;
by an icon module comprising one or more processors of the device, selecting an activity icon from a set of activity icons based on the current activity of the user and causing the selected activity icon to be displayed on the screen while the device is in the locked state, the activity icon being operable to cause display of a pop-up window that corresponds to the activity icon while the device is in the locked state; and
by an interaction module comprising one or more processors of the device:
detecting that the displayed activity icon is operated by the user;
selecting a subset of the application icons from the set of home screens based on the activity icon operated by the user; and
responsive to operation of the activity icon, generating and displaying the pop-up window that corresponds to the activity icon while the device is in the locked state, the pop-up window displaying the selected subset of the application icons and enabling operation of the selected subset of application icons while the device is in the locked state.

A second embodiment provides a method according to the first embodiment, wherein:
the displaying of the pop-up window causes at least part of the lock screen to be obscured by the selected subset of the application icons while the device is in the locked state.

A third embodiment provides a method according to the first or second embodiment, wherein:
the generating and displaying of the pop-up window includes generating and displaying a street map within the pop-up window based on the current activity of the user while the device is in the locked state.

A fourth embodiment provides a method according to the third embodiment, wherein:
the generating of the street map includes determining a zoom level of the street map based on the current activity of the user.

A fifth embodiment provides a method according to the third or fourth embodiments, wherein:
the generating of the street map includes determining a travel route from a start location to an end location based on the current activity of the user and highlighting the travel route in the street map.

A sixth embodiment provides a method according to any of the first through fifth embodiments, wherein:
the generating and displaying of the pop-up window includes generating and displaying a sub-window of content within the pop-up window based on the current activity of the user while the device is in the locked state.

A seventh embodiment provides a method according to the sixth embodiment, wherein:
the generating of the sub-window of content includes:
retrieving content from a server machine based on the current activity of the user and based on a current location of the device while the device is in the locked state; and
incorporating the retrieved content into the sub-window of content.

An eighth embodiment provides a method according to the sixth or seventh embodiments, wherein:
the generating of the sub-window of content includes:
determining an input parameter based on the current activity of the user;
causing the device to execute an application based on the input parameter while the device is in the locked state; and
incorporating an output of the application executed based on the input parameter into the sub-window of content.

A ninth embodiment provides a method according to the eighth embodiment, wherein:
the application executed based on the input parameter is a first application; and the method further comprises:
detecting a drag input by which the sub-window of content is moved toward an application icon among the subset of application icons displayed in the pop-up window while the device is in the locked state, the application icon corresponding to a second application; and
causing the device to execute the second application based on the output of the first application incorporated into the sub-window content.

A tenth embodiment provides a method according to the ninth embodiment, further comprising:
responsive to the detecting of the drag input by which the sub-window content is moved toward the application icon, causing the device to exit the locked state and enter an unlocked state in which the lock screen is not displayed on the screen of the device.

An eleventh embodiment provides a method according to the first through eighth embodiments, further comprising:
detecting that an application icon among the subset of the application icons displayed in the pop-up window is operated by the user while the device is in the locked state; and
responsive to the application icon being operated while the device is in the locked state, causing the device to execute an application that corresponds to the operated application icon.

A twelfth embodiment provides a method according to the eleventh embodiment, further comprising:
responsive to the application icon being operated while the device is in the locked state, causing the device to exit the locked state and enter an unlocked state in which the lock screen is not displayed on the screen of the device.

A thirteenth embodiment provides a method according to any of the first through twelfth embodiments, further comprising:

detecting a voice command spoken by the user while the device is in the locked state; and wherein
the causing of the selected activity icon to be displayed on the screen while the device is in the locked state is responsive to the voice command.

A fourteenth embodiment provides a method according to the thirteenth embodiment, wherein:
the selecting of the activity icon from the set of activity icons based on the current activity of the user is further based on the voice command detected while the device is in the locked state.

A fifteenth embodiment provides a method according to any of the first through fourteenth embodiments, wherein:
the detecting of the current activity is based on the context data generated by the set of sensors within the device, a preference of the user, and a log of activity data stored by the device.

A sixteenth embodiment provides a method according to any of the first through fifteenth embodiments, wherein:
the detecting of the current activity includes detecting a transition to the current activity from a previous activity in which the user of the device was engaged.

A seventeenth embodiment provides a method according to any of the first through sixteenth embodiments, wherein:
the detecting of the current activity is further based on at least one of application usage data stored by the device or application installation data stored by the device, the application usage data indicating at least one of executions of applications by the device or terminations of applications on the device, the application installation data indicating at least one of installations of applications on the device or removals of applications from the device.

An eighteenth embodiment provides a machine-readable medium (e.g., a non-transitory machine-readable storage medium) comprising instructions that, when executed by one or more processors of a machine, cause the machine to perform operations comprising:
by a detection module comprising one or more processors of the machine (e.g., a device), detecting a current activity in which a user of the machine is engaged while the machine is in a locked state, the locked state causing a screen of the machine to display a lock screen that prevents the user from accessing a set of home screens in which application icons are displayed and operable to initiate executions of applications by the machine, the detecting of the current activity being based on context data generated by a set of sensors within the machine;
by a detection module comprising one or more processors of the machine, selecting an activity icon from a set of activity icons based on the current activity of the user and causing the selected activity icon to be displayed on the screen while the machine is in the locked state, the activity icon being operable to cause display of a pop-up window that corresponds to the activity icon while the machine is in the locked state; and
by an interaction module comprising one or more processors of the machine:
detecting that the displayed activity icon is operated by the user;
selecting a subset of the application icons from the set of home screens based on the activity icon operated by the user; and
responsive to operation of the activity icon, generating and displaying the pop-up window that corresponds to the activity icon while the machine is in the locked state, the pop-up window displaying the selected subset of the application icons and enabling operation of the selected subset of application icons while the machine is in the locked state.

A nineteenth embodiment provides a machine-readable medium according to the eighteenth embodiment, wherein:
the displaying of the pop-up window causes at least part of the lock screen to be obscured by the selected subset of the application icons while the machine is in the locked state.

A twentieth embodiment provides a system comprising:
processors;
a detection module comprising one or more of the processors and configured to detect a current activity in which a user of a device is engaged while the device is in a locked state, the locked state causing a screen of the device to display a lock screen that prevents the user from accessing a set of home screens in which application icons are displayed and operable to initiate executions of applications by the device, the detecting of the current activity being based on context data generated by a set of sensors within the device;
an icon module comprising one or more of the processors and configured to select an activity icon from a set of activity icons based on the current activity of the user and causing the selected activity icon to be displayed on the screen while the device is in the locked state, the activity icon being operable to cause display of a pop-up window that corresponds to the activity icon while the device is in the locked state; and
an interaction module comprising one or more of the processors and configured to:
detect that the displayed activity icon is operated by the user;
select a subset of the application icons from the set of home screens based on the activity icon operated by the user; and
responsive to operation of the activity icon, generate and display the pop-up window that corresponds to the activity icon while the device is in the locked state, the pop-up window displaying the selected subset of the application icons and enabling operation of the selected subset of application icons while the device is in the locked state.

A twenty-first embodiment provides a system according to the twentieth embodiment, wherein:
the interaction module, in being configured to display the pop-up window, is further configured to cause at least part of the lock screen to be obscured by the selected subset of the application icons while the device is in the locked state.

A twenty-second embodiment provides a carrier medium carrying machine-readable instructions for controlling a machine to carry out the method of any one of the previously described embodiments.

What is claimed is:
1. A method comprising:
by a detection module comprising one or more processors of a device, detecting a current activity in which a user of the device is engaged while the device is in a locked state, the locked state causing a screen of the device to display a lock screen that prevents the user from accessing a set of home screens in which application icons are displayed and operable to initiate executions of applications by the device, the detecting of the current activity being based on context data generated by a set of sensors within the device;
by an icon module comprising one or more processors of the device, selecting an activity icon from a set of activity icons based on the current activity of the user and causing the selected activity icon to be displayed on the screen while the device is in the locked state, the activity icon being operable to cause display of a pop-up window that corresponds to the activity icon while the device is in the locked state; and by an interaction module comprising one or more processors of the device:

detecting that the displayed activity icon is operated by the user;

selecting a subset of the application icons from the set of home screens based on the activity icon operated by the user; and responsive to operation of the activity icon, generating and displaying the pop-up window that corresponds to the activity icon while the device is in the locked state, the pop-up window displaying the selected subset of the application icons and enabling operation of the selected subset of application icons while the device is in the locked state.

2. The method of claim 1, wherein:

the displaying of the pop-up window causes at least part of the lock screen to be obscured by the selected subset of the application icons while the device is in the locked state.

3. The method of claim 1, wherein:

the generating and displaying of the pop-up window includes generating and displaying a street map within the pop-up window based on the current activity of the user while the device is in the locked state.

4. The method of claim 3, wherein:

the generating of the street map includes determining a zoom level of the street map based on the current activity of the user.

5. The method of claim 3, wherein:

the generating of the street map includes determining a travel route from a start location to an end location based on the current activity of the user and highlighting the travel route in the street map.

6. The method of claim 1, wherein:

the generating and displaying of the pop-up window includes generating and displaying a sub-window of content within the pop-up window based on the current activity of the user while the device is in the locked state.

7. The method of claim 6, wherein:

the generating of the sub-window of content includes:

retrieving content from a server machine based on the current activity of the user and based on a current location of the device while the device is in the locked state; and incorporating the retrieved content into the sub-window of content.

8. The method of claim 6, wherein:

the generating of the sub-window of content includes:

determining an input parameter based on the current activity of the user;

causing the device to execute an application based on the input parameter while the device is in the locked state; and incorporating an output of the application executed based on the input parameter into the sub-window of content.

9. The method of claim 8, wherein:

the application executed based on the input parameter is a first application; and the method further comprises:

detecting a drag input by which the sub-window of content is moved toward an application icon among the subset of application icons displayed in the pop-up window while the device is in the locked state, the application icon corresponding to a second application; and causing the device to execute the second application based on the output of the first application incorporated into the sub-window content.

10. The method of claim 9, further comprising:

responsive to the detecting of the drag input by which the sub-window content is moved toward the application icon, causing the device to exit the locked state and enter an unlocked state in which the lock screen is not displayed on the screen of the device.

11. The method of claim 1, further comprising:

detecting that an application icon among the subset of the application icons displayed in the pop-up window is operated by the user while the device is in the locked state; and responsive to the application icon being operated while the device is in the locked state, causing the device to execute an application that corresponds to the operated application icon.

12. The method of claim 11, further comprising:

responsive to the application icon being operated while the device is in the locked state, causing the device to exit the locked state and enter an unlocked state in which the lock screen is not displayed on the screen of the device.

13. The method of claim 1, further comprising:

detecting a voice command spoken by the user while the device is in the locked state; and wherein the causing of the selected activity icon to be displayed on the screen while the device is in the locked state is responsive to the voice command.

14. The method of claim 13, wherein:

the selecting of the activity icon from the set of activity icons based on the current activity of the user is further based on the voice command detected while the device is in the locked state.

15. The method of claim 1, wherein:

the detecting of the current activity is based on the context data generated by the set of sensors within the device, a preference of the user, and a log of activity data stored by the device.

16. The method of claim 1, wherein:

the detecting of the current activity includes detecting a transition to the current activity from a previous activity in which the user of the device was engaged.

17. The method of claim 1, wherein:

the detecting of the current activity is further based on at least one of application usage data stored by the device or application installation data stored by the device, the application usage data indicating at least one of executions of applications by the device or terminations of applications on the device, the application installation data indicating at least one of installations of applications on the device or removals of applications from the device.

18. A non-transitory machine-readable storage medium comprising instructions that, when executed by one or more processors of a machine, cause the machine to perform operations comprising:

by a detection module comprising one or more processors of the machine, detecting a current activity in which a user of the machine is engaged while the machine is in a locked state, the locked state causing a screen of the machine to display a lock screen that prevents the user from accessing a set of home screens in which application icons are displayed and operable to initiate executions of applications by the machine, the detecting of the current activity being based on context data generated by a set of sensors within the machine;

by a detection module comprising one or more processors of the machine, selecting an activity icon from a set of activity icons based on the current activity of the user and causing the selected activity icon to be displayed on the screen while the machine is in the locked state, the activity icon being operable to cause display of a pop-up window that corresponds to the activity icon while the machine is in the locked state; and by an interaction module comprising one or more processors of the machine:
  detecting that the displayed activity icon is operated by the user;
  selecting a subset of the application icons from the set of home screens based on the activity icon operated by the user; and
  responsive to operation of the activity icon, generating and displaying the pop-up window that corresponds to the activity icon while the machine is in the locked state, the pop-up window displaying the selected subset of the application icons and enabling operation of the selected subset of application icons while the machine is in the locked state.

19. The non-transitory machine-readable storage medium of claim 18, wherein:
  the displaying of the pop-up window causes at least part of the lock screen to be obscured by the selected subset of the application icons while the machine is in the locked state.

20. A system comprising:
  processors;
  a detection module comprising one or more of the processors and configured to detect a current activity in which a user of a device is engaged while the device is in a locked state, the locked state causing a screen of the device to display a lock screen that prevents the user from accessing a set of home screens in which application icons are displayed and operable to initiate executions of applications by the device, the detecting of the current activity being based on context data generated by a set of sensors within the device;
  an icon module comprising one or more of the processors and configured to select an activity icon from a set of activity icons based on the current activity of the user and causing the selected activity icon to be displayed on the screen while the device is in the locked state, the activity icon being operable to cause display of a pop-up window that corresponds to the activity icon while the device is in the locked state; and
  an interaction module comprising one or more of the processors and configured to:
    detect that the displayed activity icon is operated by the user;
    select a subset of the application icons from the set of home screens based on the activity icon operated by the user; and
    responsive to operation of the activity icon, generate and display the pop-up window that corresponds to the activity icon while the device is in the locked state, the pop-up window displaying the selected subset of the application icons and enabling operation of the selected subset of application icons while the device is in the locked state.

21. The system of claim 20, wherein:
the interaction module, in being configured to display the pop-up window, is further configured to cause at least part of the lock screen to be obscured by the selected subset of the application icons while the device is in the locked state.

* * * * *